United States Patent
Morizane et al.

(10) Patent No.: US 6,556,913 B2
(45) Date of Patent: Apr. 29, 2003

(54) CRUISE CONTROL SYSTEM AND VEHICLE LOADED WITH THE SAME

(75) Inventors: Hiroto Morizane, Hitachi (JP); Hiroshi Takenaga, Naka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/794,331

(22) Filed: Feb. 28, 2001

(65) Prior Publication Data

US 2002/0026274 A1 Feb. 28, 2002

(30) Foreign Application Priority Data

Aug. 29, 2000 (JP) ........................................ 2000-258990

(51) Int. Cl.[7] .............................................. B60K 31/00
(52) U.S. Cl. ........................................... 701/93; 701/96
(58) Field of Search ............................... 701/93, 96, 98; 340/52, 54, 70, 71, 72, 53, 96, 300, 301; 180/170, 179, 167, 178

(56) References Cited

U.S. PATENT DOCUMENTS

| 5,901,800 A | * | 5/1999 | Takahashi | 180/170 |
| 6,161,071 A | * | 12/2000 | Shuman et al. | 701/96 |
| 6,311,123 B1 | * | 10/2001 | Nakamura et al. | 701/300 |
| 6,360,170 B1 | * | 3/2002 | Ishikawa et al. | 701/300 |
| 6,362,773 B1 | * | 3/2002 | Pöchmüller | 342/52 |

FOREIGN PATENT DOCUMENTS

JP 6-229759 8/1994

* cited by examiner

Primary Examiner—Richard M. Camby
(74) Attorney, Agent, or Firm—Antonelli, Terry, Stout & Kraus, LLP

(57) ABSTRACT

It is an object of the invention to provide a more practical ACC system. During a travel of a vehicle, an image processor successively extracts geometric feature values of image patterns of a leading vehicle from image data successively outputted from a camera device mounted at the front of the vehicle. When a travel start detector detects a travel of the vehicle, a reference parameter value setting process section of a microcomputer sets a geometric feature value of an image pattern of the leading vehicle extracted at appropriate timing as a reference parameter value. Thereafter, each time a geometric feature value of the image pattern of the leading vehicle is extracted, a target driving force calculation process section calculates a target driving force Ttar for reducing any difference between the geometric feature value and the value set as the reference parameter value. A vehicle controller supplies to controllers a control command in accordance with the target driving force.

14 Claims, 24 Drawing Sheets

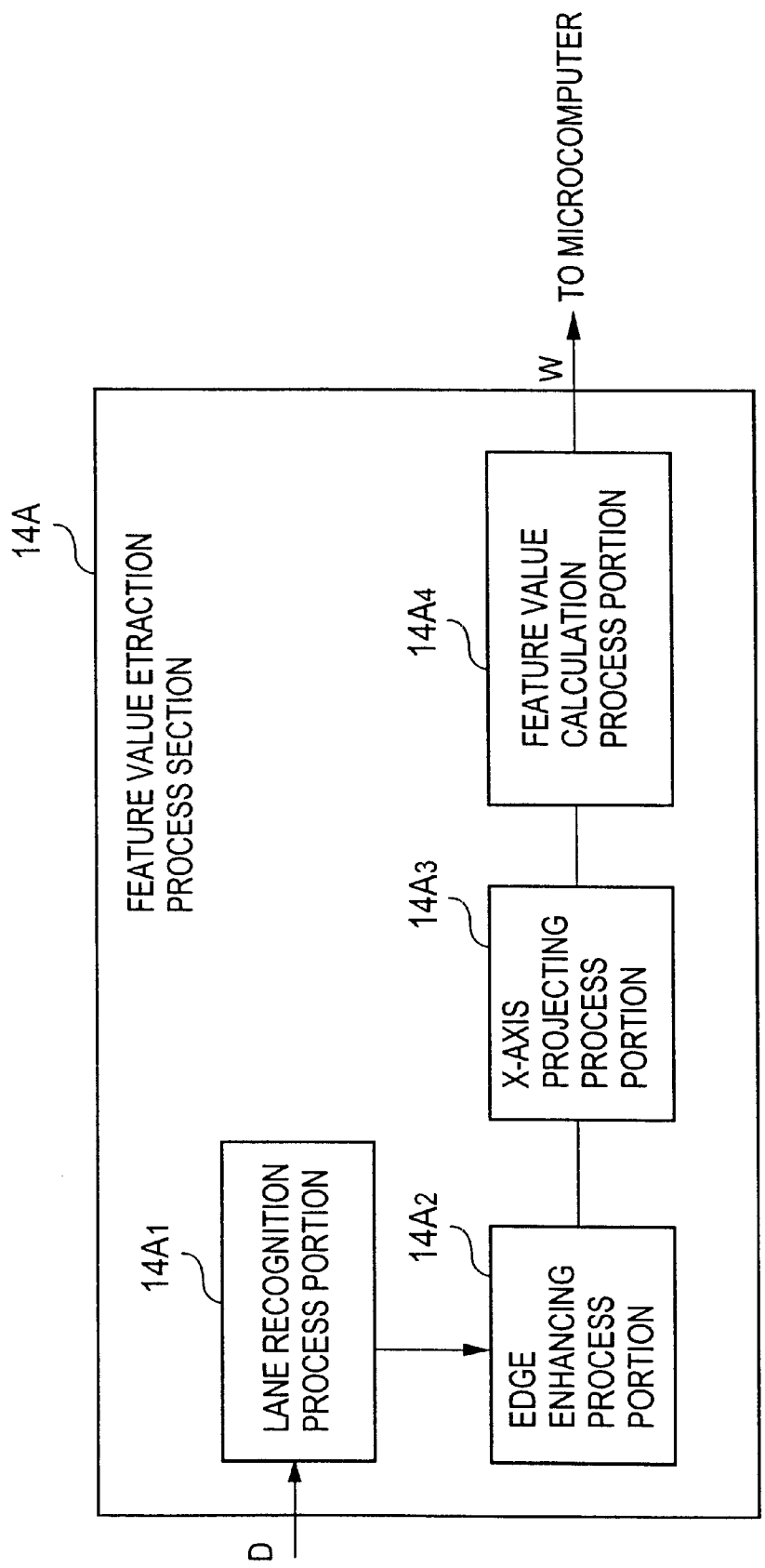

FIG.5A  FIG.5B  FIG.5C
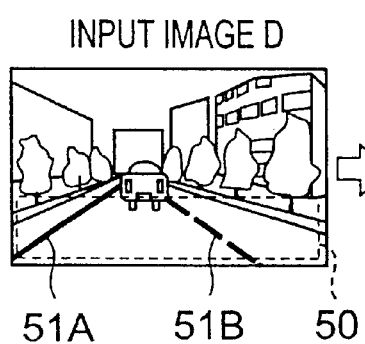
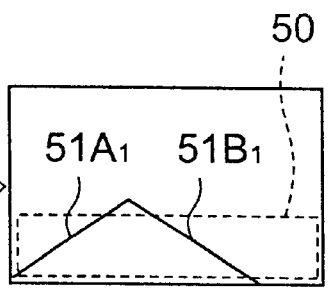
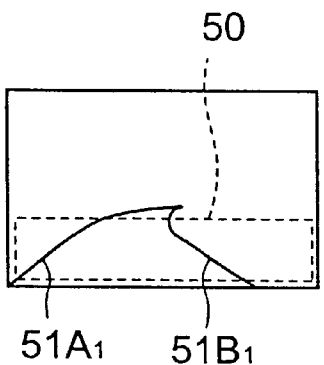
FIG.6
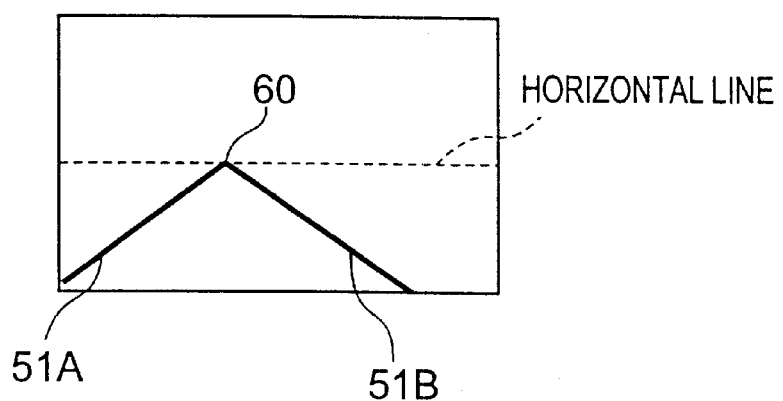

PHOTOGRAPHED IMAGE

CRUISE CONTROL SYSTEM AND VEHICLE LOADED WITH THE SAME

This application claims a priority based on Japanese Patent Application No. 2000-258990 filed on Aug. 29, 2000, the entire contents of which are incorporated herein by reference for all purposes.

BACKGROUND OF THE INVENTION

The present invention relates to an ACC (adaptive cruise control) system for extracting information associated with a following distance between a vehicle and another vehicle leading the same from an image of the leading vehicle photographed with a camera and for controlling the following distance between the vehicles based on the information.

An ACC (adaptive cruise control) apparatus loaded on a vehicle (hereinafter referred to as "master vehicle") sense is a distance between the master vehicle and another vehicle in front (hereinafter referred to as "leading vehicle") and controls the engine and braking system of the vehicle to keep an appropriate following distance between vehicles. In order to sense the following distance between the master vehicle and the leading vehicle, (a) some ACC apparatuses employ a distance measuring device such as an electric wave radar or laser radar and (b) some ACC apparatuses employ image processing on an image photographed with a stereoscopic camera, single-lens camera or the like. As an example of the latter type (b), Japanese unexamined patent publication No. H6-229759 has disclosed a distance estimator for estimating the following distance between a master vehicle and a leading vehicle based on an image of the leading vehicle photographed with a single-lens camera from behind. A description on the distance estimator will follow.

In the distance estimator, vehicle image data representing an appearance (rear view) of each type of vehicles as viewed from behind the vehicle and vehicle width data are registered in advance. The distance estimator successively extracts images of a leading vehicle from images photographed with a single-lens camera and searches the registered data to get vehicle width data associated with the vehicle image data that matches the first extracted image out of the registered data. When the vehicle width data of the leading vehicle is obtained as a result of the search, the distance estimator thereafter calculates, every time an image of the leading vehicle is extracted, the following distance between the master vehicle and the leading vehicle based on the number of pixels in the horizontal direction constituting the extracted image, the vehicle width data of the leading vehicle, the horizontal angle of view of the single-lens camera and the number of the pixels of the image in the horizontal direction photographed with the single-lens camera.

In the case of the distance estimator disclosed in the Japanese unexamined patent publication No. H6-229759, there is a need for registering vehicle image data and vehicle width data of major types of vehicles when it is actually used. Since a great amount of data is registered when the vehicle image data and vehicle width data of major types of vehicles are thus registered, it takes a long time to search vehicle width data of the leading vehicle.

SUMMARY OF THE INVENTION

In order to provide a more practical ACC system, in a cruise control system according to the present invention, a geometric feature value extracted from an image pattern of a leading vehicle at a predetermined timing is set as a reference parameter value for feature value of subsequent image patterns of the leading vehicle.

BRIEF DESCRIPTION OF THE DRAWINGS

FIG. 3 is a detailed functional configuration diagram of an image processor according to the first embodiment of the invention.

FIGS. 5A through 5C are illustrations for explaining a process performed by a lane recognition process portion.

FIG. 6 is a conceptual diagram showing a mask pattern produced by the lane recognition process portion.

DESCRIPTION OF THE PREFERRED EMBODIMENTS

An embodiment of the present invention will now be described with reference to the accompanying drawings.

Figure 2A:
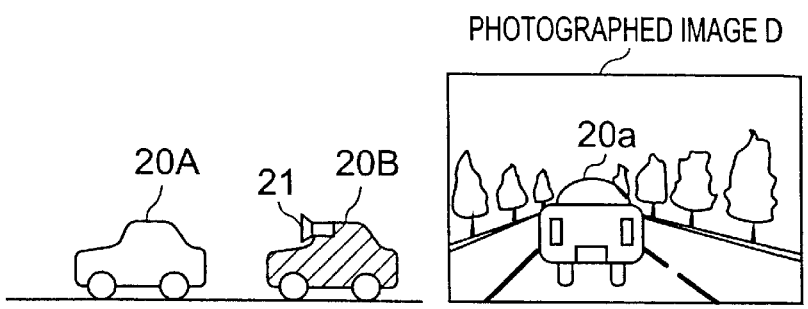
FIG. 2A is an illustration for explaining the relationship between a change in the following distance from a master vehicle to a leading vehicle and a change in an image photographed by a camera device mounted on the master vehicle.

First, a principle behind the determination of the following distance between vehicles according to the present embodiment will be described. n the following description the term "in front of a vehicle" means a traveling direction of the vehicle, and the term "behind a vehicle" means the direction opposite to the traveling direction of the vehicle, A camera 21 is mounted on a vehicle 205 in advance for photographing the view in front of the vehicle. As shown in FIG. 2A, when the vehicle 20B stops behind a vehicle 20A (a leading vehicle) that has stopped, an image photographed by the camera 21 includes an image pattern 20a which is the appearance of the rear end of the leading vehicle 20A at a stop (rear view).

Figure 2B:
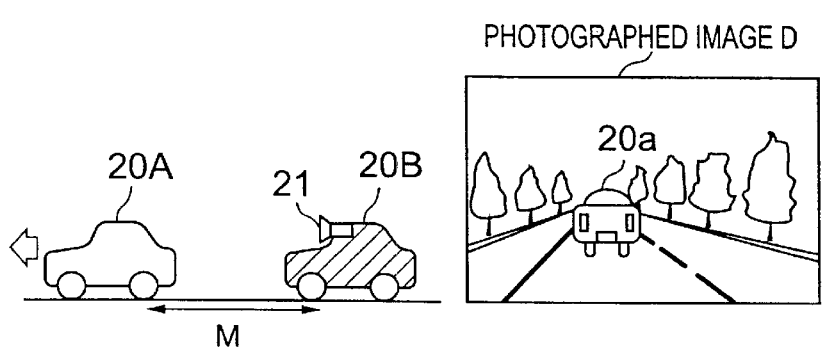
FIG. 2B is another illustration for explaining the relationship between a change in the following distance from a master vehicle to a leading vehicle and a change in an image photographed by a camera device mounted on the master vehicle.
Figure 2C:
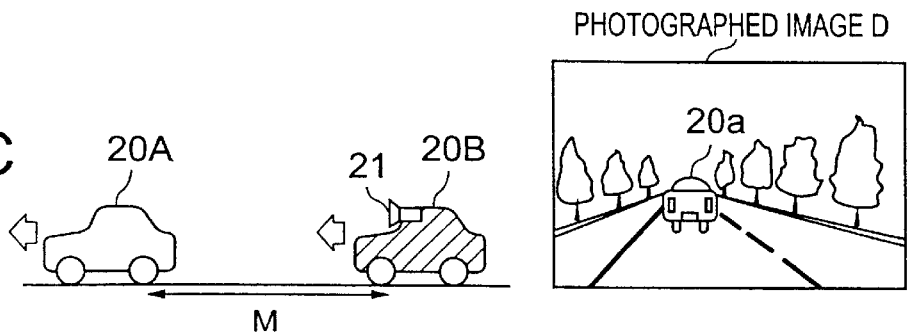
FIG. 2C is still another illustration for explaining the relationship between a change in the following distance from a master vehicle to a leading vehicle and a change in an image photographed by a camera device mounted on the master vehicle.

When either of the vehicles starts from such a state, a geometric feature of the image pattern 20a of the leading vehicle 20A (e.g., width or area of the pattern or the interval between the taillights) in an image D photographed by the camera 21 changes depending on a distance M between the camera 21 an d the leading vehicle 20A. For example, when only the leading vehicle 20A starts as shown in FIG. 2B, since the leading vehicle 20A moves away the camera 21, the width of the image pattern 20a of the leading vehicle 20A gradually decreases in the image D photographed by the camera 21. When both the two vehicles 20A and 20B start as shown in FIG. 2C, the width of the image pattern 20a of the leading vehicle 20A gradually decreases in the image D photographed by the camera 21 if the distance between the leading vehicle 20A and the camera 21 increases. On the contrary, if the distance between the leading vehicle 20A and the camera 21 decreases, the width of the image pattern 20a of the leading vehicle 20A gradually increases in the image D photographed by the camera 21.

As thus described, the geometric feature of the image pattern 20a of the leading vehicle in the image D photographed by thy camera 21 on the following vehicle 20B changes depending on the distance M between camera 21 and the leading vehicle 20A i.e, the following distance between the vehicles 20B and 20A. Therefore, the following distance M between the vehicle 20A and 20B can be kept constant by controlling the following vehicle 20B such that the geometric feature of the image pattern 20a of the leading vehicle included in the image D photographed by the camera 21 on the following vehicle 20B will not change. Specifically, when the geometric feature value of the image pattern 20a of the leading vehicle increases, a braking force may be generated at the following vehicle 20B to increase the following distance M to the leading vehicle 20A. On the contrary, when the geometric feature value of the image pattern 20a of the leading vehicle decreases, a driving force may be generated at the following vehicle 20B to decrease the following distance M to the leading vehicle 20A. Obviously, the current driving force of the following vehicle 20B may be maintained when there is no change in the geometric feature value of the image pattern 20a of the leading vehicle.

A description will now be made with reference to FIGS. 1 and 3 on a system loaded on the vehicle 20B to achieve vehicle control based on such a principle of determination (hereinafter referred to as "on-board system"). A description will be made here on an example in which the width of an image pattern 20a of a leading vehicle is extracted as a geometric feature of the image pattern 20a of the leading vehicle.

Figure 1:
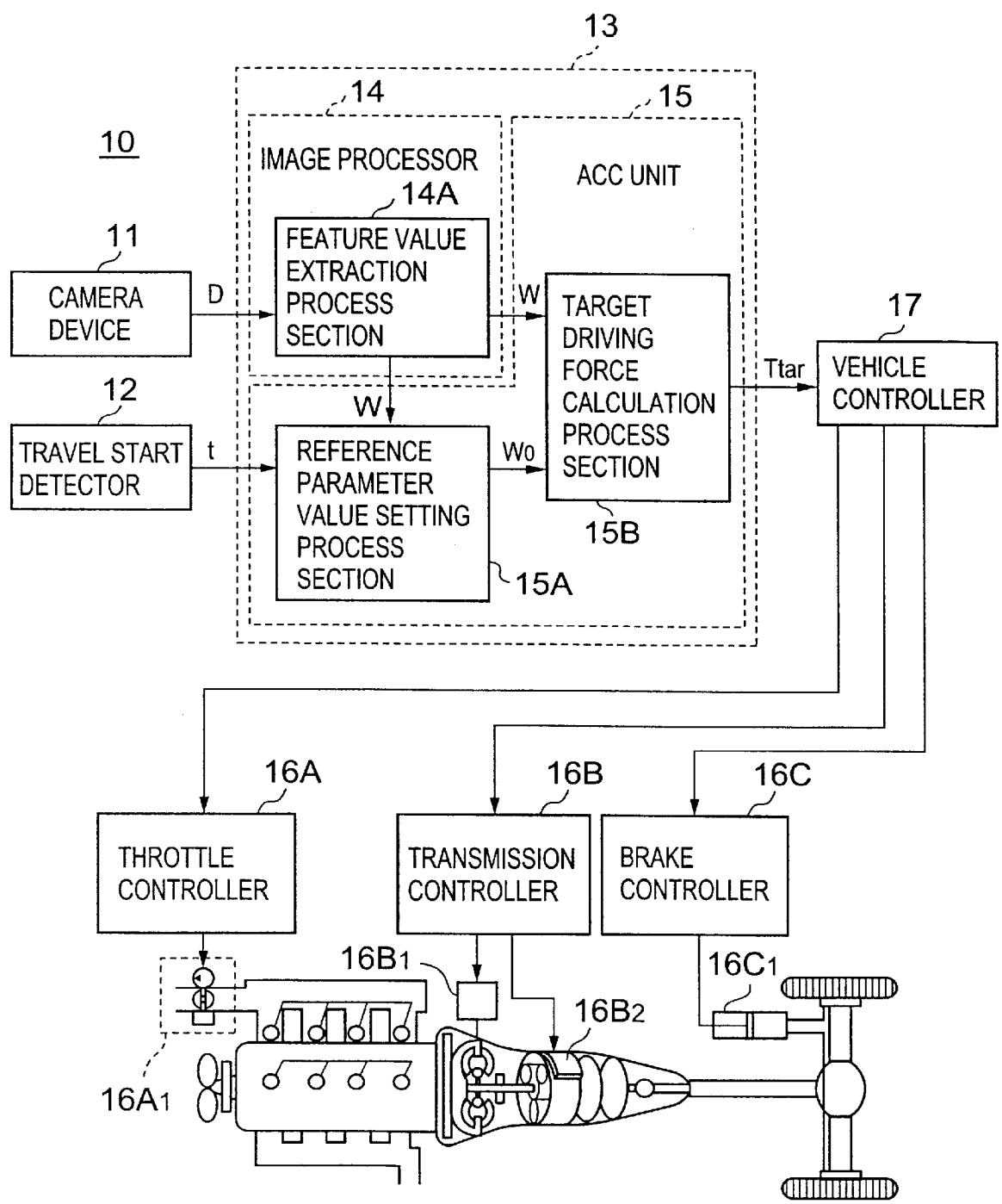
FIG. 1 is a schematic configuration diagram of a system according to a first embodiment of the invention.

As shown in FIG. 1, the on-board system 10 has a camera device 11 such as a CCD camera for photographing the view in front of a vehicle 20B on which the system is loaded, a travel start detector 12 for detecting a timing when the vehicle starts traveling (for example, when the accelerator is pressed), controllers for controlling various actuators for changing the driving force of the vehicle 20B (f or example, a throttle controller 16A for controlling the position of a throttle valve $16A_1$, a transmission controller 16S for controlling the position of a lock-up solenoid valve $16B_1$ and the opening of a solenoid valve $16B_2$ for changing speed and a brake controller 16C for controlling a brake actuator $16C_1$), an ACC (adaptive cruise control) unit 13 for calculating a target driving force Ttar required for maintaining a following distance to a leading vehicle 20A, a vehicle controller 17 for controlling each controller in accordance with the result of the calculation at the ACC unit 13, and so on.

The ACC unit 13 has an image processor 14 that accepts image data D, successively outputted from the camera device 11 and a microcomputer 15 that outputs control commands S to be supplied to the throttle controller and so on.

Referring to a functional configuration of the image processor 14, it serves as (1) a feature value extraction process section 14A for extracting a geometric feature value W of an image pattern 20a of a leading vehicle from image data D each time the image data D is outputted from the camera device 11 and for outputting the geometric feature value W. As shown In FIG. 3, the feature value extraction process section 14A includes (2) a lane recognition process portion 14A$_1$ if or recognizing image patterns of white lines on both sides of the lane on which the vehicle 20B and leading vehicle 20A are traveling and for producing a mask pattern for limiting image processing to the inside of the contour of the image pattern of the lane based on the result of the recognition, (3) an edge enhancing process portion 14A$_2$ for enhancing of horizontal edges in the image pattern 20a of the reading vehicle using the mask pattern produced by the lane recognition process portion 14A$_1$, (4) an X-axis projection process portion 14A$_3$ for projecting the horizontal edges enhanced by the edge enhancing process portion 14A$_2$ on 4n X-axis and (5) a feature value calculation process portion 14A$_4$ for calculating the number of pixels of the image projected on the X-axis by the X-axis projection process portion 14A$_3$.

Referring to a functional configuration of the microcomputer 15, it serves as (6) a reference parameter value, setting process section 15A which captures the output W of the feature value extraction process section 14A. and sets the same as reference parameter value W$_0$ when the start of a travel of the vehicle is detected and (7) a target driving force calculation process section 15B which calculates a target driving force Ttar for reducing any difference between geometric feature values W successively outputted from the feature value extraction process section 14A and the reference parameter value W$_0$ set by the reference parameter value setting process section 15A as a control command to be supplied to the vehicle controller 17.

Processes performed by the on-board system 10 will now be described.

Figure 4:
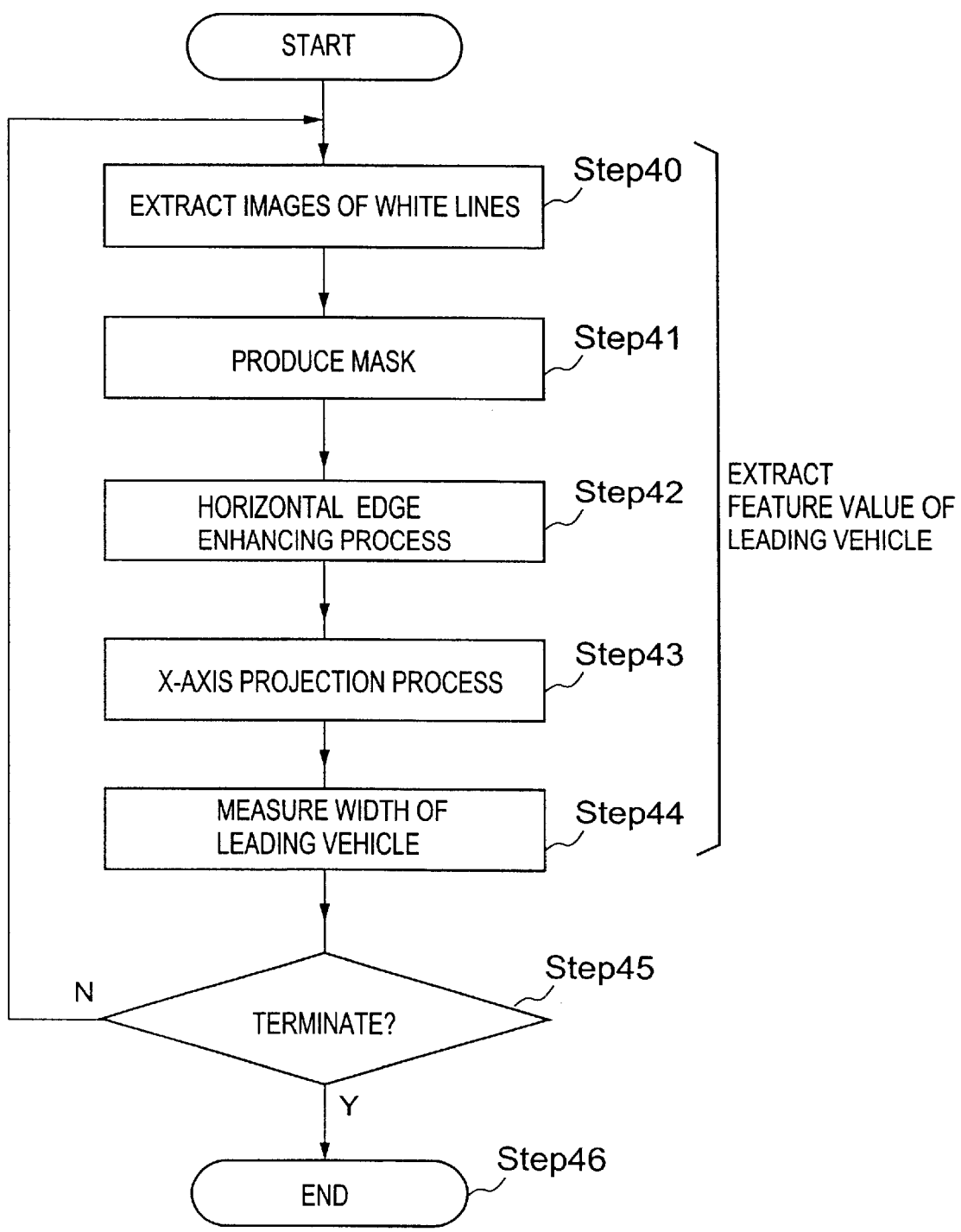
FIG. 4 is a flow chart showing processes performed by the image processor according to the first embodiment of the invention.

When the microcomputer 15 instructs the execution of the processes, the image processor 14 performs the processes according to the flow chart in FIG. 4 as described below.

Each time the feature value extraction process section 14A accepts image data D, which are successively outputted from the camera device 11, it extracts a geometric feature of an image pattern 20a of the leading vehicle included in the image data D and outputs the same to the microcomputer 15. Specifically, each time it accepts the image data D successively outputted from the camera device 11, the functional portions 14A$_3$, 14A$_2$, 14A$_3$ and 14A$_4$ in FIG. 3 perform the following processes (steps 40 through 44).

First, the lane recognition process portion 14A$_1$ detects image patterns of white lines provided on both sides of the lane on which the vehicle 20B and the leading vehicle 20A are traveling from an image D inputted from the camera device 11 (step 40). FIGS. 5A through 5C show an example of a method of detection used by the lane recognition process portion 14A$_1$ at this time. As shown in FIG. 5A, a window 50 including a predetermined area at a short range is set in the image D inputted from the camera device 11 and. as shown in FIG. 5B, image patterns 51A and 515 of the two white lines included in the window 50 are detected as two straight lines 51A$_1$ and 51B$_1$ by means of Hough transform or the like. When the vehicle 20B is traveling a curved road, as shown in FIG. 5C, extensions of those straight lines 51A$_1$ and 51B$_1$ outside the window 50 are approximated to the curve along the shape of the lane on which the vehicle 20B is traveling.

When the lane recognition process portion 14A$_1$ detects the image patterns 51A and 51B of the lane on which the vehicle 20B is traveling, it generates a mask pattern for limiting the image processing to the inside of the contour (step 41). Specifically, a mask pattern is produced whose boundary is given by the image patterns 51A$_1$ and 51B$_1$ of the two white lines and a vanishing point which is an intersection 60 between those patterns, as shown in FIG. 6.

Figure 7:
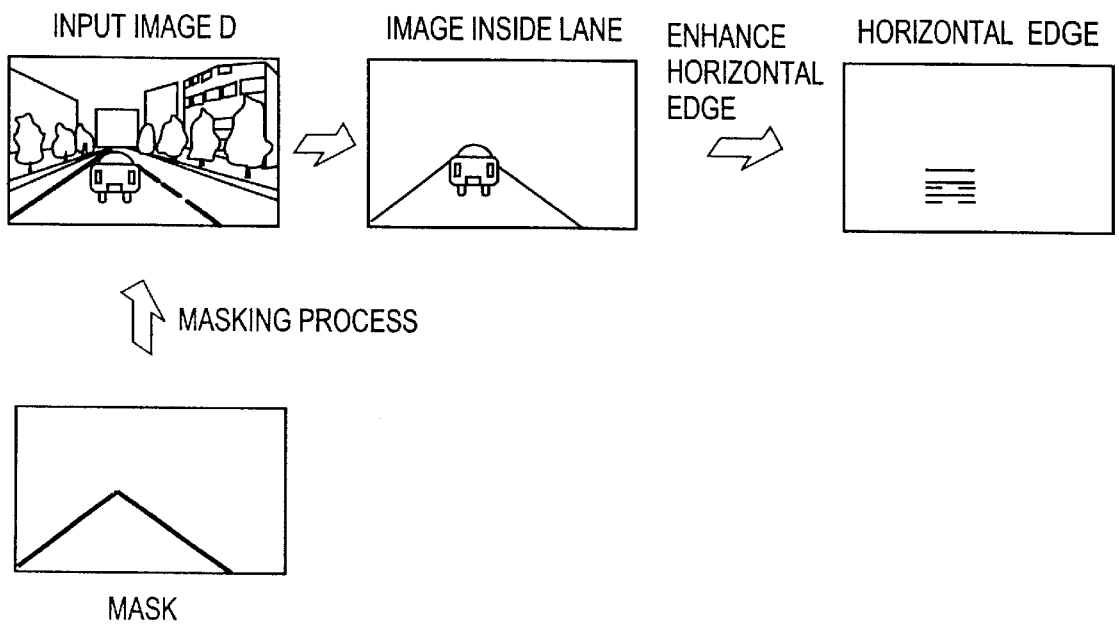
FIG. 7 is illustrations for explaining a process performed by an edge enhancing process portion.

Thereafter, the edge enhancing process portion 14A$_2$ performs a masking process on the input image D using the mask pattern as shown in FIG. 7 and enhances horizontal edges of the image patterns included in the image area which are to be subjected to image processing using a filter such as a Sobel filter for enhancing horizontal edges (step 42). Since an image pattern of a vehicle generally, comparing to the image pattern of the road, includes many horizontal edges, most of horizontal edges obtained by the edge enhancing process at this time are edges that have been included in the image pattern of the vehicle located ahead the master vehicle.

Figure 8:
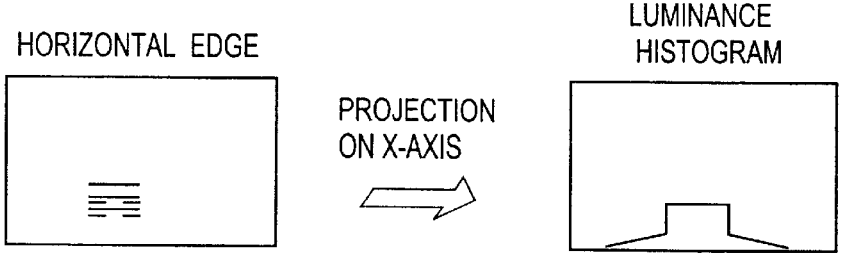
FIG. 8 is a diagram for explaining a process performed by an X-axis projection process portion.

Thereafter, the X-axis projection process portion 14A$_3$ projects the horizontal edges obtained at step 42 on an X-axis defined in the horizontal direction. Then, an intensity histogram of the projected image on the X-axis is generated as shown in FIG. 8 (step 43).

The feature value calculation process portion 14A$_4$ detects a region in which intensity values equal to or higher than a threshold are continuously distributed from the histogram generated at step 43 and calculates the number of pixels of the projected image associated with the same region (step 44). The result W of the calculation is outputted to the microcomputer 15. As a result, a scalar W corresponding to the width of the image pattern 20a of the leading vehicle 20A in the direction of the X-axis is outputted to the microcomputer 15 as a geometric feature value of the pattern.

The feature value extraction process section 14A repeatedly performs the above-described feature value extraction process (steps 40 through 44) to successively extract geometric feature value of the image pattern 20a of the leading vehicle 20A and waits for an instruction for the termination of the process from the microcomputer 15 while repeating the process (step 45). It terminates the process upon receipt of the instruction (step 46).

When the engine of the master vehicle 20B is started, the microcomputer 15 initializes the reference parameter value and instructs the image processor 14 to perform the process of extracting a feature value from an image pattern of the leading vehicle. Then, it cooperates with the vehicle controller 17 to perform the following processes In accordance with the flow chart in FIG. 9. Since some of the processes at the microcomputer 15 are triggered by an external event, the process in the ACC unit as a whole does not always proceed in the order of the steps shown in the flow chart in FIG. 9.

The reference parameter value setting process section 15A waits until the travel starting time t of the vehicle 20B is detected by the travel start detector 12 while successively receiving the input of the data W outputted from the image processor 14 (step 90). When the travel starting time t of the vehicle 20B is detected by the travel start detector 12, the first geometric feature value W that exceeds the threshold after the time t among those successively inputted from the image processor 14 is set as a reference parameter value W$_0$ which serves as a reference parameter value for feature value of image patterns of the leading vehicle (step 91). As a result, the geometric feature value of an image pattern 20a of the leading vehicles which is detected when the leading vehicle 20A enters the field of view of the camera device 11, is set as a reference parameter value $W_0$.

Each time data W equal to or higher than the threshold is inputted from the image processor 14 after a certain value is set as the reference parameter value $W_0$, the target driving force calculation process section 15B uses Formula (1) to calculate a driving force Ttar required for making the data W inputted from the image processor 14 and the reference parameter value $W_0$ equal to each other, i. e., a target driving force Ttar required for maintaining a following distance M between the vehicles when the geometric feature value is set as a reference parameter, the driving force being supplied to the vehicle controller 17 as a control command (step 92), $$\text{Stat}=KI\cdot\int\Delta Wdt+Kp\cdot\Delta W+Kd\cdot\Delta W/dt+\text{Tbase} \quad \text{Formula (1)}$$

where KI represents a control gain of the integral term; Kp represents a control gain of the comparative term; Kd represents a control gain of the differential term; and Tbase represents the current driving force of the master vehicle, $\Delta W$ is; a difference $(W_0-W)$ between the data W inputted from the image processor 14 and the reference parameter value $W_0$.

When a control command Ttar is supplied from the target driving force calculation process section 15B, the vehicle controller 17 calculates the throttle valve position, solenoid valve position and braking force based on the control command Ttar and supplies the results of the calculations to the controller as control commands (step 93). For example, when the difference ($\Delta W$ $W_0-W$) between the data W inputted from the image processor 14 and the reference parameter value $W_0$ of is a positive value ($\Delta W>0$), since the target driving force Ttar is a positive value, the vehicle controller 17 supplies to the target driving force Ttar to the throttle controller 16A as a control command, a value of throttle position required for increasing the current driving force Ttar. On the contrary, when the difference $\Delta W$ between the data W inputted from the image processor 14 and the reference parameter value $W_0$ of is a negative value ($\Delta W<0$), since the target driving force Ttar is a negative value, the vehicle controller 17 supplies to the brake controller 168 as a control command, a value of braking force required for decreasing the current driving force to the target driving force Ttar. Obviously, when the data W inputted from the image, processor 14 and the reference parameter value $W_0$ are equal, to each other ($\Delta W=W_0-W=0$), the vehicle controller 17 supplies a control command for maintaining the current driving conditions to the controllers.

When such control commands are supplied, the controllers 16A, 16B and 16C control the actuators $16A_1$, $16B_1$, $16B_2$ and $16C_1$ in accordance with the respective control commands. As a result, the following distance between the vehicle 20B and the leading vehicle 20A is constantly maintained at the value at the time when the geometric feature value was set as the reference parameter. When the engine of the vehicle 20B is stopped (step 94) at any time during the execution of the above-described processes (steps 91 through 93), the microcomputer 15 instructs the image processor 14 to terminate the. process and also terminates the process at itself (step 95). When another travel starting time t of the vehicle 20B is detected by the travel start detector 12 at any time before the process at the microcomputer 15 itself is terminated, the microprocessor returns the process to step 91.

As thus described, the process executed by the system of the present embodiment sets a geometric feature value of an image pattern of a leading vehicle extracted at predetermined timing as a reference parameter value for geometric feature value of subsequent image patterns of the leading vehicle, regardless of the type of the vehicle. Therefore, there is no need for executing a process of searching an enormous amount of registered data as in the case of the distance estimator described in the section of the related art. This makes it possible to start vehicle control quickly. Further, there is no need for registering vehicle image data and vehicle width data of major types of vehicles in advance.

In the above description, after detecting the start of driving of the vehicle 20B, the first geometric feature value extracted from an image pattern 20a of a leading vehicle 20A that has entered the field of view of a camera device 11 serves as a reference parameter value for geometric feature value of image patterns 20a of the leading vehicle 20A. A reference parameter value for image patterns 20a of a leading vehicle 20A may be defined using other methods. A description will now be made on a case in which a reference parameter value for image patterns 20a of a leading vehicle 20A is defined using a method different from that described above. The description will be focused on differences from the above description.

Figure 10A:
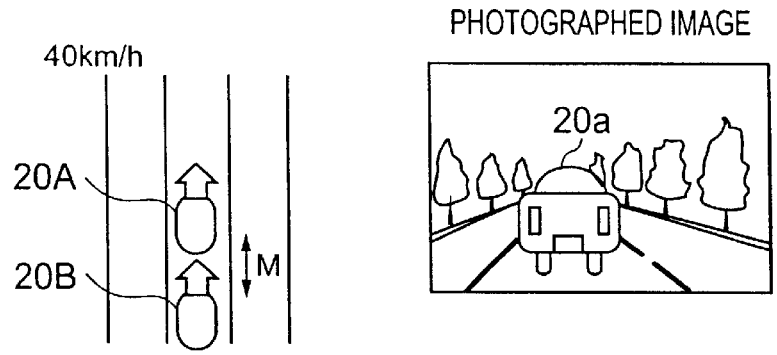
FIG. 10A is an illustration for explaining the relationship between a change in the traveling speed of a vehicle and a change in an image photographed by a camera device mounted on the vehicle.
Figure 10B:
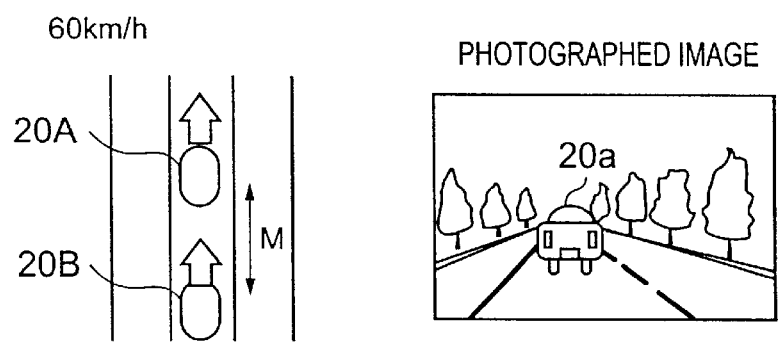
FIG. 10B is another illustration for explaining the relationship between a change in the traveling speed of a vehicle and a change in an image photographed by a camera device mounted on the vehicle.
Figure 10C:
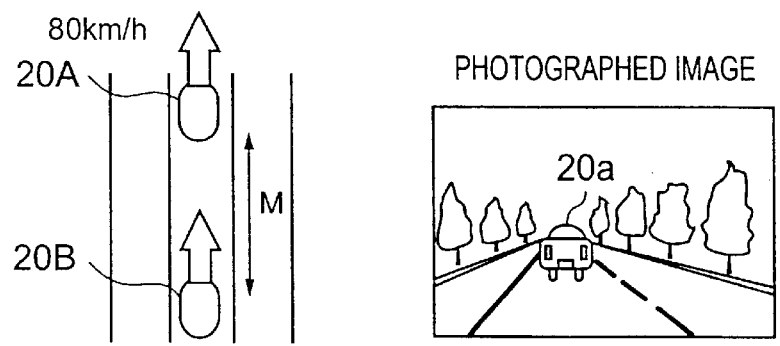
FIG. 10C is still another illustration for explaining the relationship between a change in the traveling speed of vehicle and a change in an image photographed by a camera device mounted on the vehicle.

In general, a driver tends to keep a longer following distance between a master vehicle 20B and a leading vehicle 20A when traveling at higher rate, such as traveling on an expressway, because the braking distance required for stopping the vehicle 20B increases when the traveling speed of the vehicle 20B becomes higher. For, example, a driver attempts to keep a larger following distance M between the master vehicle 20B and a leading vehicle 20A when following the leading vehicle 20A on a road for which a speed limit of 60 km/h is set as shown in FIG. 10B than when following the leading vehicle 20A on a road for which a speed limit of 40 km/h is set as shown in FIG. 10A. The driver will attempt to keep a still larger following distance M between his or her vehicle 20B and the leading vehicle 20A when following the leading vehicle 20A on a road for which a speed limit of 80 km/h is set as shown in FIG. 10C than when following the leading vehicle 20A on a road for which a speed limit of 60 km/h is set. Therefore, as apparent from a comparison between FIGS. 10A, 10B and 10C, an image pattern 20a of the leading vehicle 20A becomes smaller in the image photographed by the camera device 11 as the traveling speed of the vehicle 20B increases.

Figure 11:
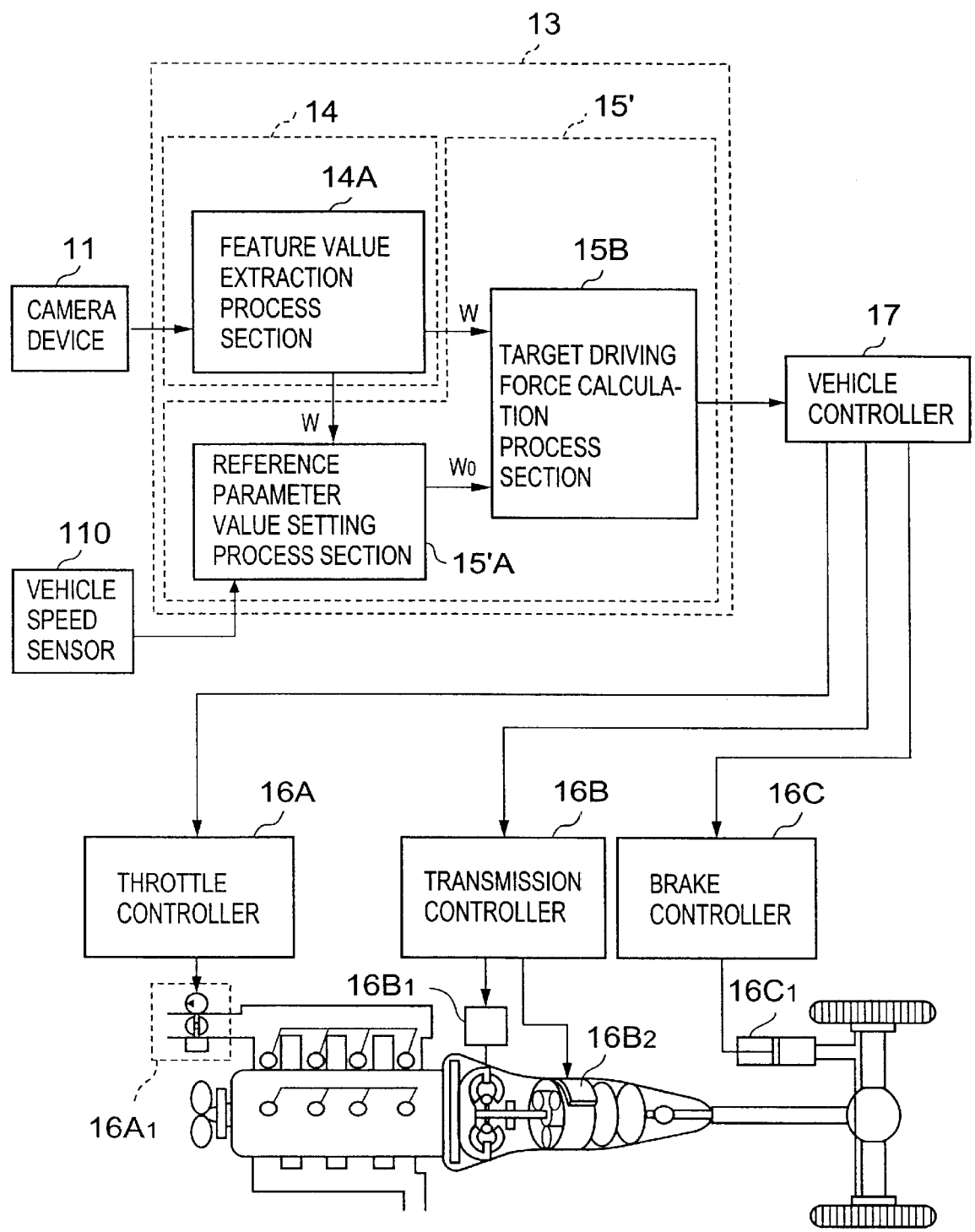
FIG. 11 is a schematic configuration diagram of a system according to a second embodiment of the invention.
Figure 12:
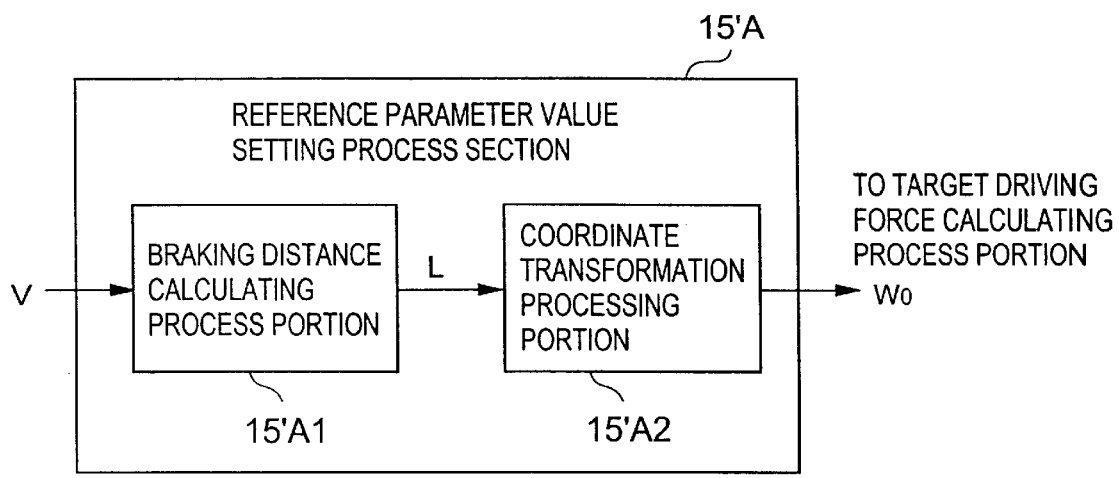
FIG. 12 is a detailed functional configuration diagram of a reference parameter value setting process section according to the second embodiment of the invention.

Let us assume here that a reference parameter value for geometric feature value of the image patterns 20a of the leading vehicle 20A is defined based on the speed V of the master vehicle 20B. For this purpose, an existing vehicle speed sensor 110 must be connected to the ACC unit 13 in place of the travel start detector 12 as shown in FIG. 11, in order to detect the traveling speed V of the vehicle 205 successively. While the hardware is otherwise the same as that of the system shown in FIG. 1, a microcomputer 15'of the system shown in FIG. 11 performs processes different from those of the microcomputer 15 in FIG. 1. Therefore, a reference parameter value setting process section 15'A implemented by the microcomputer 15' of the system in FIG. 11 includes (8) a braking distance calculation process portion $15'A_1$ for calculating a braking distance L required by the vehicle 20B to stop based on data V outputted from. the vehicle speed sensor 110 and (9) a coordinate transformation process portion $15'A_2$ for calculating a reference parameter value for geometric feature value of image patterns 20a of the leading vehicle 20A based on the braking distance L calculated by the braking distance calculation process portion $15'A_1$.

Processes performed by the microcomputer 15' in the system of FIG. 11 will now be specifically described.

Figure 13:
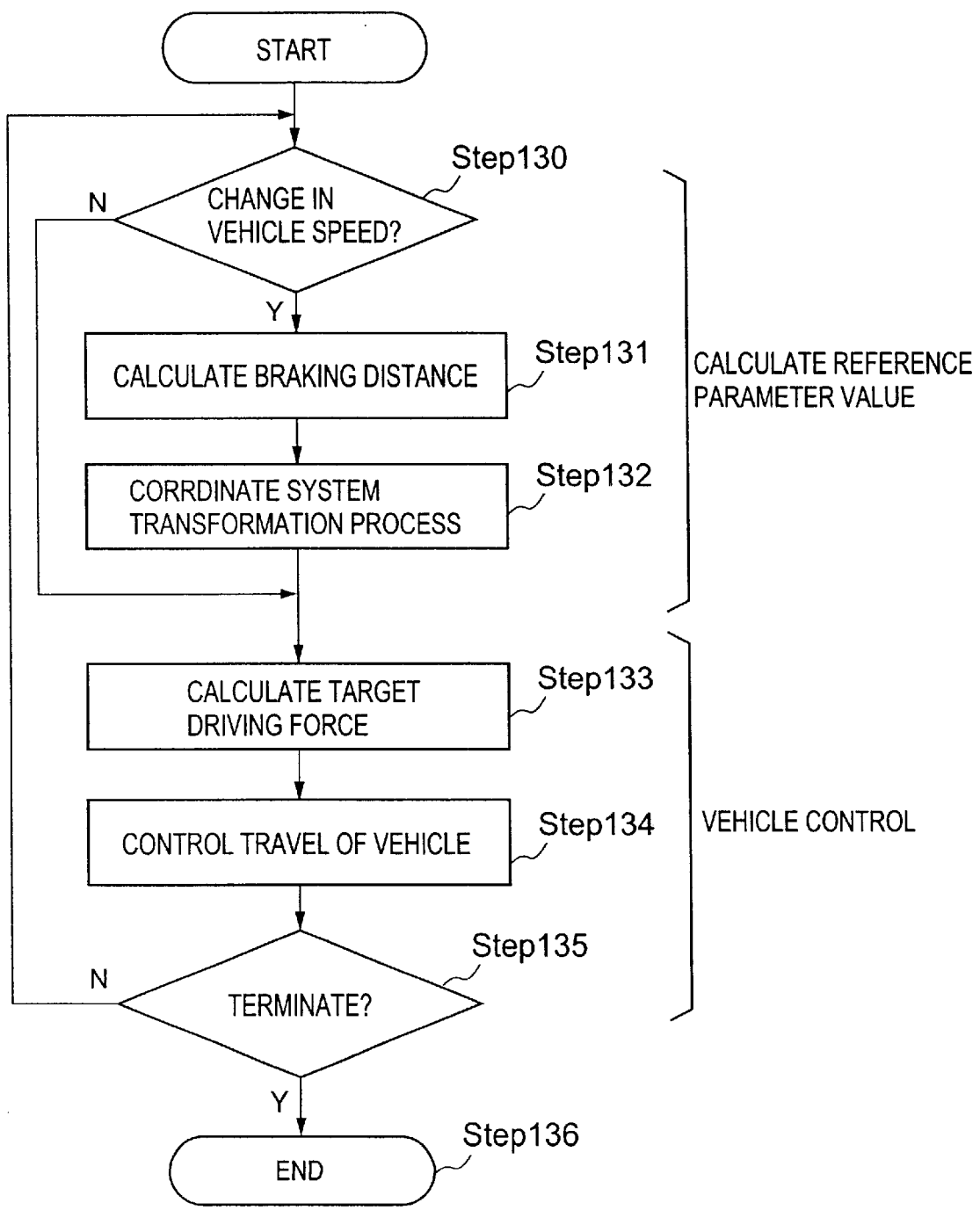
FIG. 13 is a flow chart showing processes performed by a microcomputer and a vehicle controller according to the second embodiment of the invention.

After initializing a reference parameter value W, the microcomputer 15' in FIG. 11 executed processes according to the flow chart in FIG. 13. In this case, since some of the processes at the microcomputer 15' are triggered by an external event, the process at the ACC unit as a whole does not always proceed according to the steps shown in the flow chart in FIG. 13.

Each time the distance calculation process portion 15'$A_1$ accepts vehicle speed data V from the vehicle speed sensor 110, it determines whether a change in the vehicle speed data V within a predetermined time has exceeded a predetermined value (for example, 10 km/h) or not (step 130).

When the change in the vehicle speed data V within the predetermined time has exceeded the predetermined value, the braking distance calculation process portion 15'$A_1$ calculates a braking distance L required for the vehicle 20B to stop based on the latest vehicle speed data V (step 131). Since the braking distance L of the vehicle and the square $V^2$ of the vehicle speed V are in a linear relationship, the braking distance L of the vehicle 20B is calculated using the following Formula (2) or a map created based on Formula (2) (a map representing the relationship between L and V).

$$L = \alpha \cdot V^2 + \beta \qquad \text{Formula (2)}$$

where α and β are constants.

Figure 14:
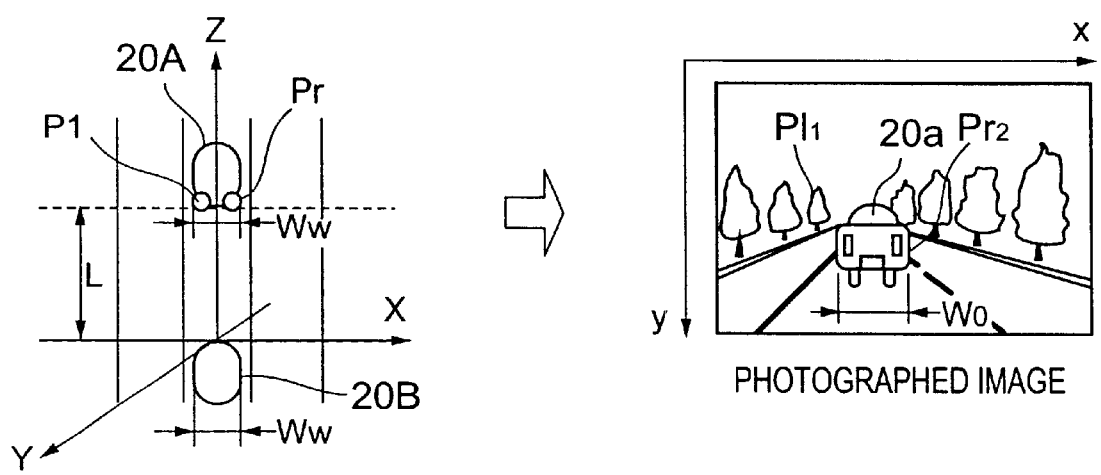
FIG. 14 is illustrations for explaining a method for calculating a reference parameter value for image patterns of a leading vehicle based on the speed of the master vehicle.

When a braking distance L of the vehicle 20B is calculated, the coordinate transformation process portion 15'$A_2$ calculates a reference parameter value for geometric feature value of image patterns 20a of a leading vehicle based on the braking distance L and sets the result of the calculation as the reference parameter value $W_0$ (step 132). FIG. 14 shows an example of a method for calculating a reference parameter value used at step 132. Let us assume that an imaginary vehicle 20$A_1$ having the sane vehicle width $W_W$ as that of the vehicle 20B exists at a location apart from the vehicle 20B by the braking distance L in a world coordinate system XYZ whose origin is the center of the lens of the camera device 11. When the world coordinate system XYZ is a right hand coordinate system whose Z-axis is the traveling direction of the vehicle 20B, the coordinates of the left and right rear edges Pl and Pr of the imaginary vehicle 20$A_1$ are expressed by ($-W_W/2, M, L$) and ($+W_W/2, H, L$). The two points Pl and Pr are projected upon a screen coordinate system xy on which an image photographed by the camera device 11 is projected, and the interval between projected images Pl$_1$ and Pr$_1$ is calculated as a reference parameter value for geometric features of image patterns 20a of a leading vehicle. Coordinate transformation from the world coordinate system XYZ into the screen coordinate system xy may be carried out using Formulas (3) and (4).

$$x = -F \cdot X / (Z \cdot \cos\phi - Y \cdot \sin\phi) \qquad \text{Formula (3)}$$

$$y = F \cdot (Y \cdot \cos\phi - Z \cdot \sin\phi) / (Z \cdot \cos\phi - Y \cdot \sin\phi) \qquad \text{Formula (4)}$$

where F represents the focus of the camera device 11 and φ represents the pitch of the camera device.

Figure 9:
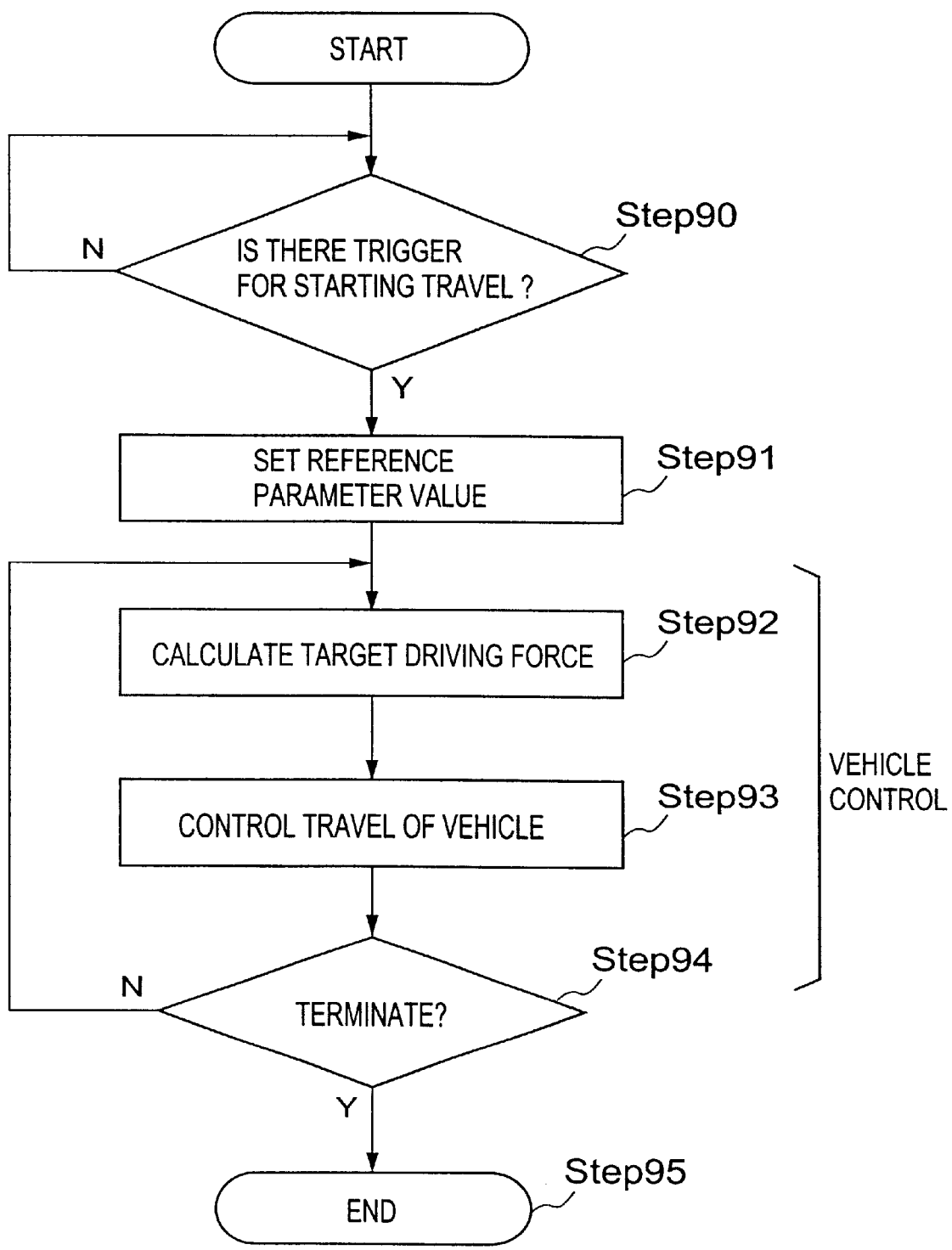
FIG. 9 is a flow chart showing processes performed by a microcomputer and a vehicle controller according to the first embodiment of the invention.

When a certain value is thus set as the reference parameter value $W_0$, processes (steps 133 and 134) similar to those at steps 92 and 93 of the flow chart in FIG. 9 are thereafter performed by the target driving force calculation process section 15B and the vehicle controller 17 each time data W equal to or greater than a threshold is inputted from the image processor 14 unless it is determined at step 130 that a change in the vehicle speed data V within a predetermined time has exceeded the threshold.

When the engine of the vehicle 20B is stopped (step 135) at any time during the execution of the above described process (steps 130 through 134), the microcomputer 15' instructs the image processor 14 to terminate the process and also terminates the process at itself (step 136).

By connecting a vehicle speed sensor to the microcomputer to execute such a process, it is possible to maintain a following distance that satisfies a braking distance required for the master vehicle to stop between the master vehicle and the leading vehicle. This improves the safety of a travel on a road. Further, since a traveling condition is maintained such that it matches a psychological tendency of a driver to keep a longer vehicle distance as the vehicle speed increases, it is possible to give a reel of safety to a driver.

When a reference parameter value for geometric feature value of image patterns 20a of a leading vehicle Is thus defined as a reference parameter value $W_0$ based on the vehicle speed V of a vehicle 20B, an initial value of the reference parameter value $W_0$ may be set using the same method as that of the system in FIG. 1.

Figure 15:
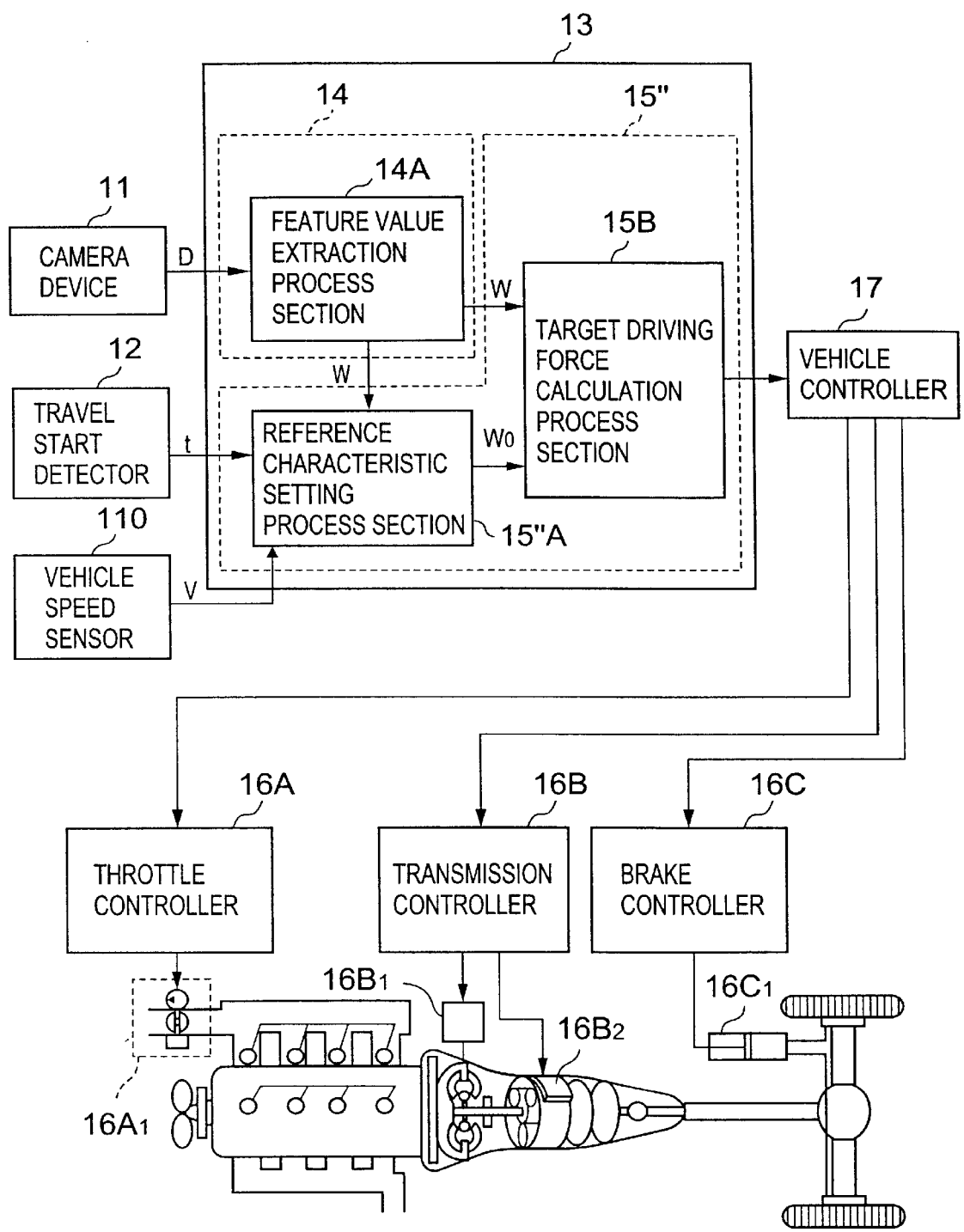
FIG. 15 is a schematic configuration diagram of a system according to a third embodiment of the invention.

For this purpose, as shown in FIG. 15, a travel start detector 12 similar to that in FIG. 1 must be added to a system having a hardware configuration similar to that shown in FIG. 11. Further, the function of a microcomputer 15" must be expanded. As a result, in addition to the braking distance calculation process portion 15'$A_1$ and the coordinate transformation process portion 15'$A_2$ as described above, a reference parameter value setting process section 15"A implemented by the microcomputer 15" of the system shown in FIG. 15 includes (10) a reference parameter value selection process portion 15"$A_3$ for setting either a reference parameter value calculated by the coordinate transformation process portion 15$A_2$ based on the vehicle speed or a geometric feature value extracted by an image processor 14 from a photographed image D, as the reference parameter value $W_0$ depending on the traveling condition of the vehicle 20B.

Processes performed by the microcomputer 15" and vehicle speed controller 17 in FIG. 15 will now be specifically described.

Figure 17:
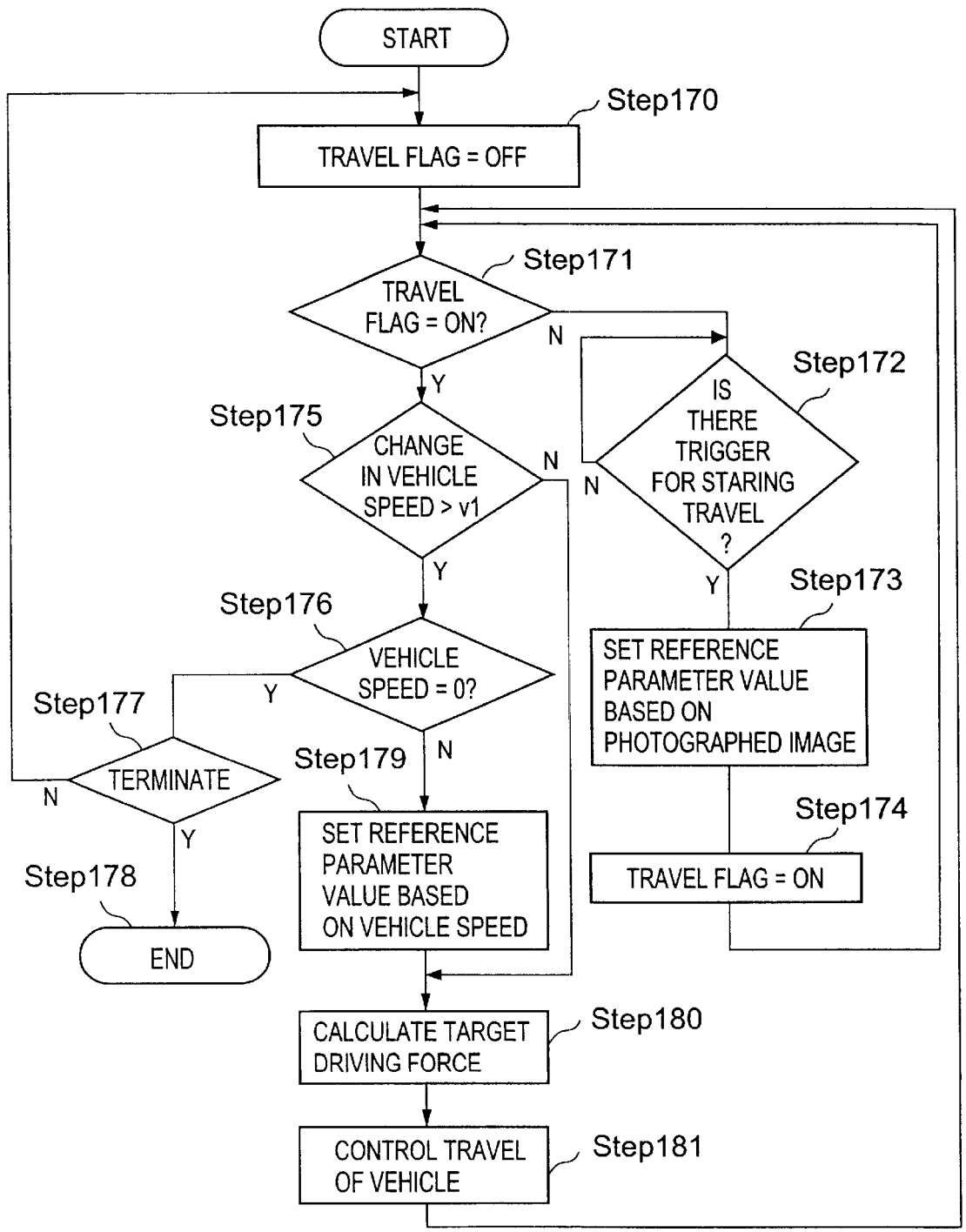
FIG. 17 is a flow chart showing processes performed by a microcomputer and a vehicle controller according to the third embodiment of the invention.

The microcomputer 15" in FIG. 15 instructs the image processor 14 to execute a process of extracting a geometric feature value of an image pattern of a leading vehicle, initializes the reference parameter value $W_0$, and thereafter performs processes according to the flow chart shown in FIG. 17.

First, the reference parameter value selection process portion 15"$A_3$ initializes a traveling condition flag F representing the traveling condition of the vehicle 20B (step 170). As a result, a value ("OFF" in this case) indicating that the vehicle 20B is at a stop is set in the traveling condition flag F.

Thereafter, the reference parameter value selection process portion 15"$A_3$ determines the value in the traveling condition flag F (step 171).

If the value in the traveling condition flag F is "OFF", it waits until the travel start detector 12 detects a time t at which the vehicle 20B starts traveling (step 172).

When the travel start detector 12 detects a travel starting time t, the reference parameter value selection process portion 15"$A_3$ thereafter sets the first geometric feature value W that exceeds a threshold, as an initial value of the reference parameter value $W_0$ (step 173). Then, the reference parameter value selection process portion. 15"$A_3$ sets a value ("ON" in this case) indicating that the vehicle 20B is traveling in the traveling condition flag F (step 174). Thereafter, the process returns to step 170.

If the value in the traveling condition flag F is "ON", each time the braking distance calculation process portion 15'$A_1$ accepts vehicle speed data V from the vehicle speed sensor 110, it determines whether a quantity of change ΔV of the vehicle speed data V within a predetermined time exceeds a predetermined quantity $V_1$ (e.g., 10 km/h) or not (step 175).

At this time, if the change ΔV of the vehicle speed data V within the predetermined time is not in the excess of the predetermined $V_1$, the target driving force calculation process section 15B and vehicle controller 17 perform processes similar to the processes performed at steps 92 and 93 in the flow chart of FIG. 9 (steps 180 and 181). The process thereafter returns to step 171.

On the contrary, if the change ΔV is in the excess of the predetermined $V_1$, it is determined whether the vehicle speed data V indicates 0 km/h or not (step 176).

If the vehicle speed data V from the vehicle speed sensor 110 indicates 0 km/h, the microcomputer 15 determines whether the engine of the vehicle 20B is in a stop state or not (step 177). If the engine of the vehicle 20B is not in the stop state, the process returns to step 170 and, if the engine of the vehicle 20B is in the stop state, the microcomputer instructs the image processor 14 to terminate the process and also terminates the process at itself (step 178).

If the vehicle data V from the vehicle speed sensor 110 does not indicate 0 km/h, similarly to the processes performed at steps 131 and 132 of the flow chart in FIG. 13, the braking distance calculation process portion $15'A_1$ calculates a braking distance L for the vehicle 20B based on tho latest vehicle speed data V, and the coordinate transformation process portion $15'A_2$ thereafter calculates a reference parameter value for geometric feature value of the image patterns 20a of the leading vehicle based on the braking distance L. The reference parameter value selection process portion $15''A_3$ updates the reference parameter value $W_0$ with the value thus calculated (step 179). Thereafter, processes at step 180 and subsequent steps are performed in the same way as in the case wherein a quantity of change of the vehicle speed data V within a predetermined time does not exceed a threshold.

As a result of such a process, while the reference parameter value $W_0$ is updated based on the traveling speed when the master vehicle is traveling, the reference parameter value $W_0$ is defined based on a geometric feature value of an image pattern 20a of the leading vehicle immediately after the start of a travel when the vehicle speed changes abruptly. This makes it possible to prevent unwanted fluctuation of the reference parameter value $W_0$ immediately after the start of a travel when the vehicle speed changes abruptly.

Figure 18:
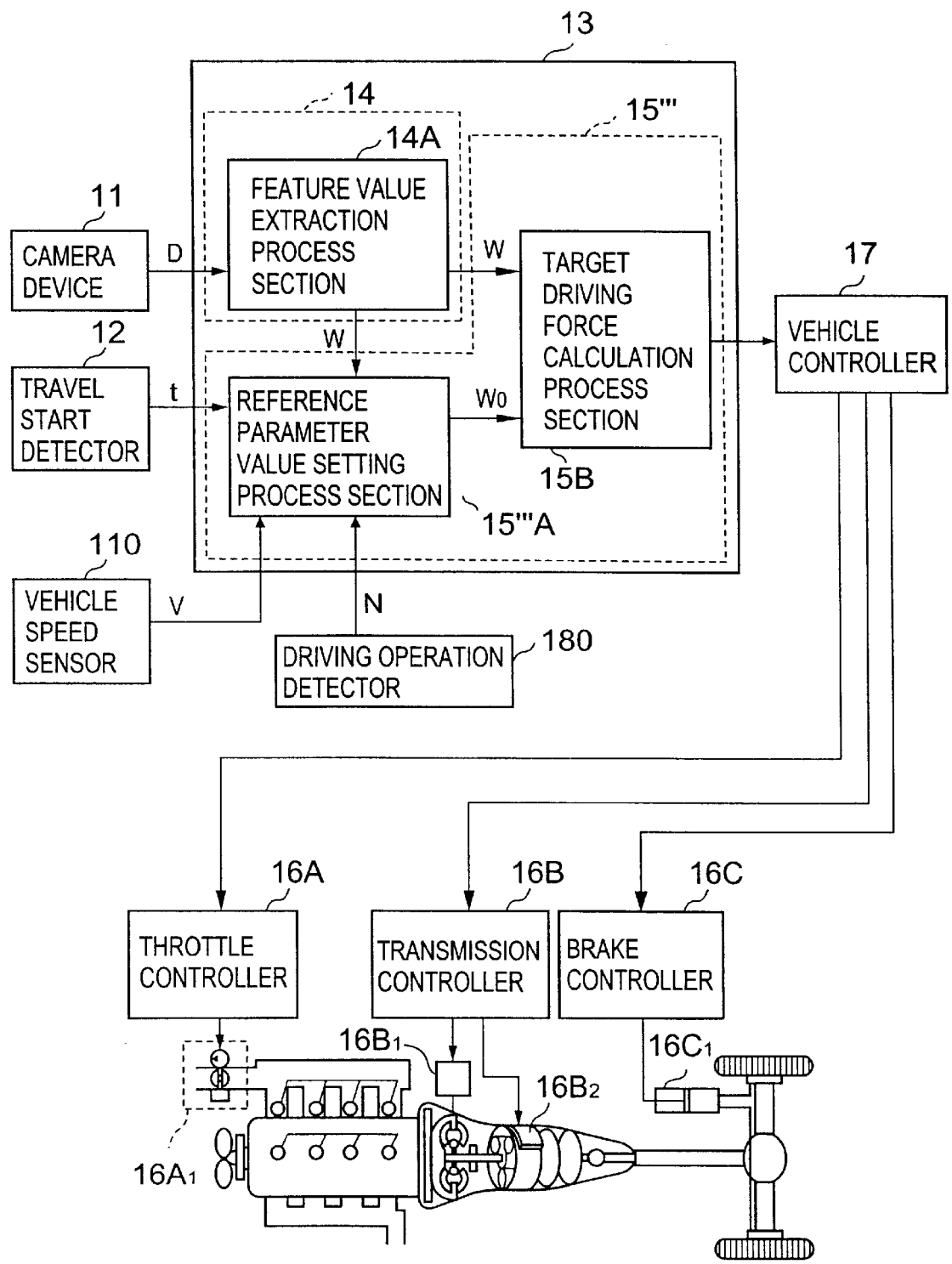
FIG. 18 is a schematic configuration diagram of a system according to a fourth embodiment of the invention.
Figure 19:
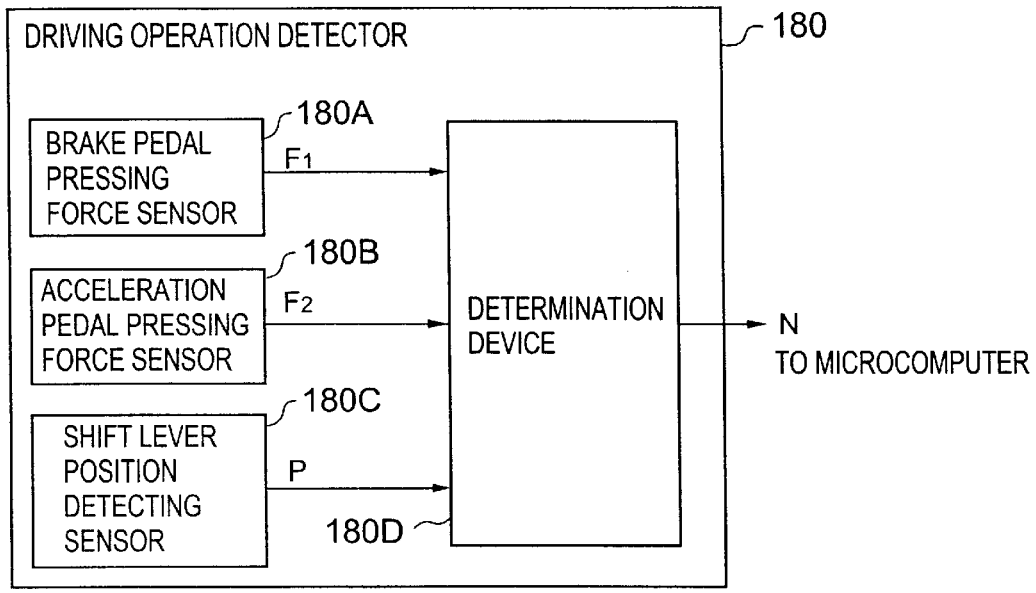
FIG. 19 is a diagram showing an example of an internal configuration of the driving operation detector in FIG. 18.

As described above, when a traveling vehicle has any fluctuation of the vehicle speed equal to or greater than a predetermined value, the system in FIG. 11 or 15 updates the reference parameter value $W_0$ based on the vehicle speed after the fluctuation. However, this is not limiting the present invention. For example, the reference parameter value $W_0$ may be updated, when the driver performs any driving operation, based on the vehicle speed at the time of occurrence of the driving operation, which makes it possible to reflect the preference of the driver in driving upon the following distance between the master vehicle 20B and leading vehicle 20A. For this purpose, a driving operation detector for detecting driving operations of a driver needs to be added to a system having a hardware configuration similar to that shown in FIG. 15 or 11. In addition, some changes must be made at least in the processes performed by the microcomputer, more specifically, the processes performed by the reference parameter value selection process portion. As shown in FIG. 18, a description will be made on an example of such a case in which a driving operation detector 180 is added to the system of FIG. 15.

The driving operation detector 180 added to the system has (11) a sensor for detecting predetermined driving operations and (12) a determination device for successively determining the presence or absence of any driving operation based on the output of the sensor and for outputting data N indicating the occurrence of any driving operation.

Figure 21A:
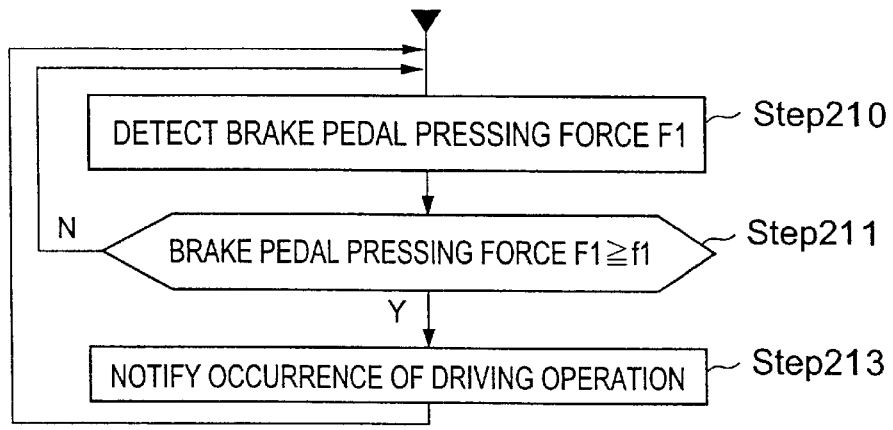
FIG. 21A is a flow chart showing processes performed by tie driving operation detector in FIG. 19.
Figure 21B:
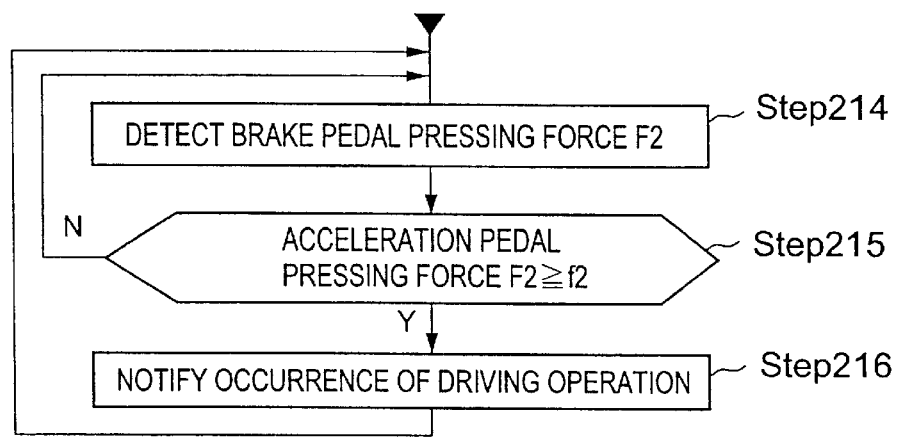
FIG. 21B is a flow chart showing processes performed by the driving operation detector in FIG. 19.
Figure 21C:
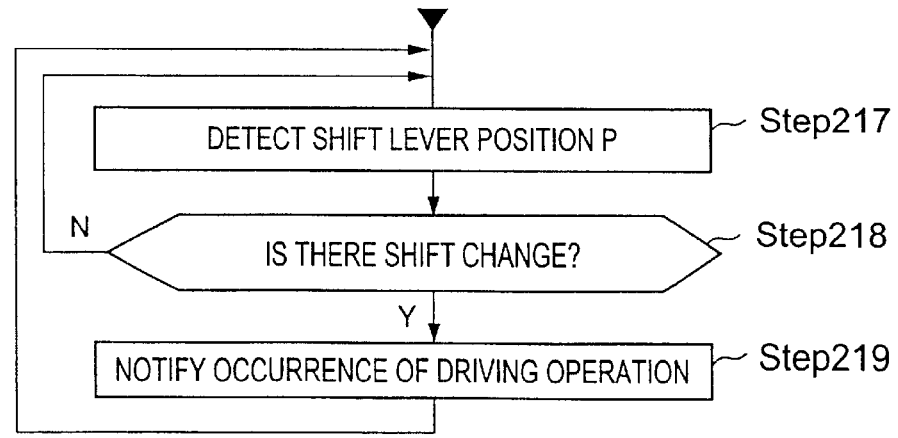
FIG. 21C is a flow chart showing processes performed by the driving operation detector in FIG. 19.

For example, when three types of driving operations of a driver, i.e., a press on the acceleration pedal, a press on the foot brake and an operation on the shift lever are detected, the driving operation detector 180 added to the system needs to have (11) a brake pedal pressing force sensor 180A for successively measuring a force (pressing force) $F_1$ applied by the driver to the brake pedal, (11) an egg acceleration pedal pressing force sensor 180B for successively measuring a force (pressing force) $F_2$ applied by the driver to the acceleration pedal, (11) a shift lever position detecting sensor 180C for successively detecting the position P of the shift lever and (12) a determination device 180D for successively determining the presence and absence of any driving operation based on the output from each of the sensors 180A, 180B and 180C and for notifying the microcomputer 15 of the occurrence of any driving operation. In the driving operation detector 180 having such a configuration, the determination device 180D needs to concurrently execute three types of determination processes as described below during a travel of the vehicle. As shown in FIG. 21A, each time a pressing force $F_1$ is detected by the brake pedal pressing force sensor 180A (step 210), the determination device 180D determines whether the detected value $F_1$ is equal to or greater than a threshold $f_1$ (step 211) and, if the value is determined to be equal to or greater than the threshold $f_1$, it outputs data N indicating the occurrence of a driving operation (step 213). As shown in FIG. 21B, each time a pressing force $F_2$ is detected by the acceleration pedal pressing force sensor 180B (step 214), the determination device 180D determines whether the detected value $F_2$ is equal to or greater than a threshold $f_2$ (step 215) and, if the value is determined to be equal to or greater than the threshold $f_2$, it outputs data N indicating the occurrence of a driving operation (step 216). As shown in FIG. 21C, each time the position P of the shift lever is detected by the shift lever position sensor 180C (step 217) the determination device 180D determines whether there has been any change in the position P (step 218) and, if it is determined that there has been a change, it outputs data N indicating the occurrence of a driving operation (step 219).

Figure 16:
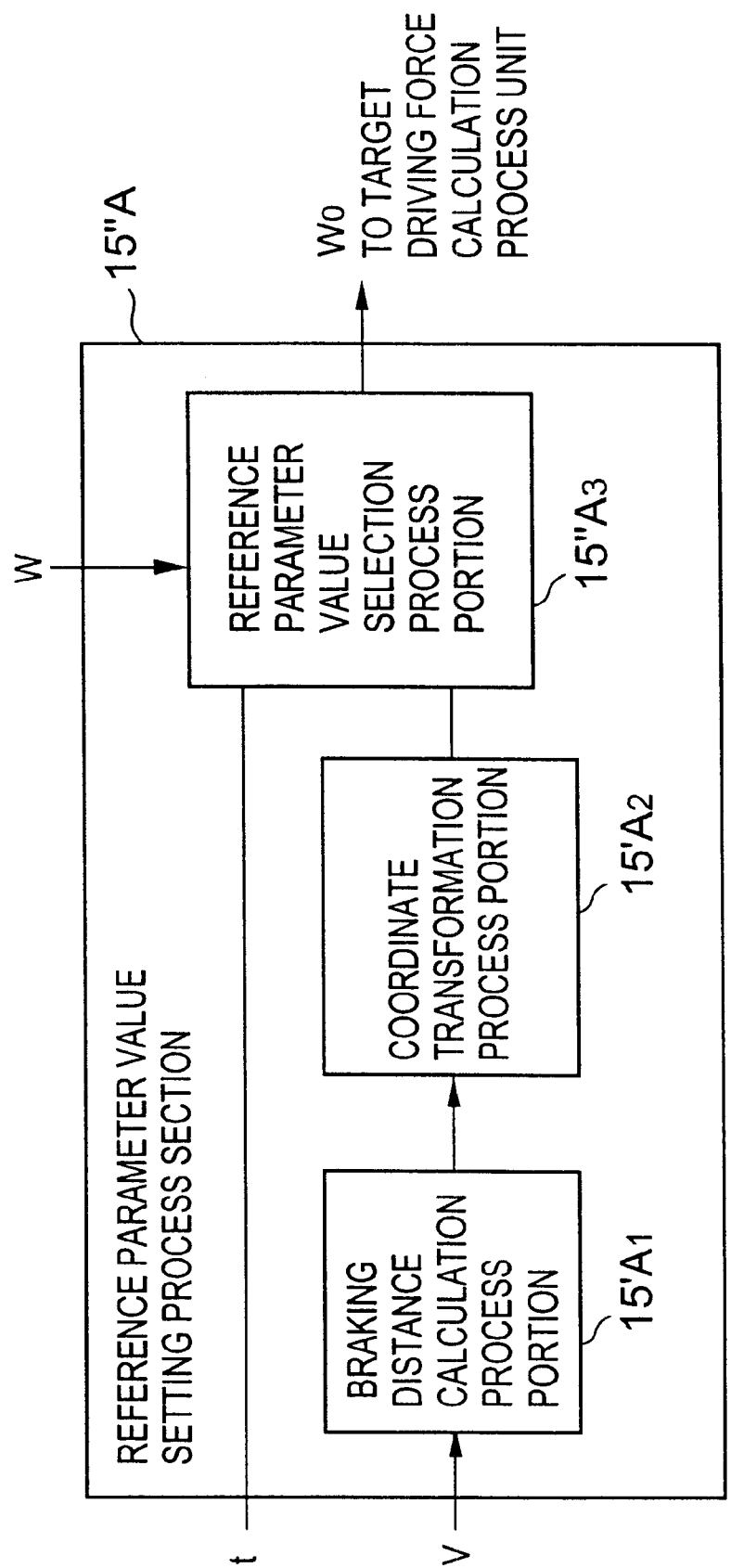
FIG. 16 is a detailed functional configuration diagram of a reference parameter value setting process section according to the third embodiment of the invention.
Figure 20:
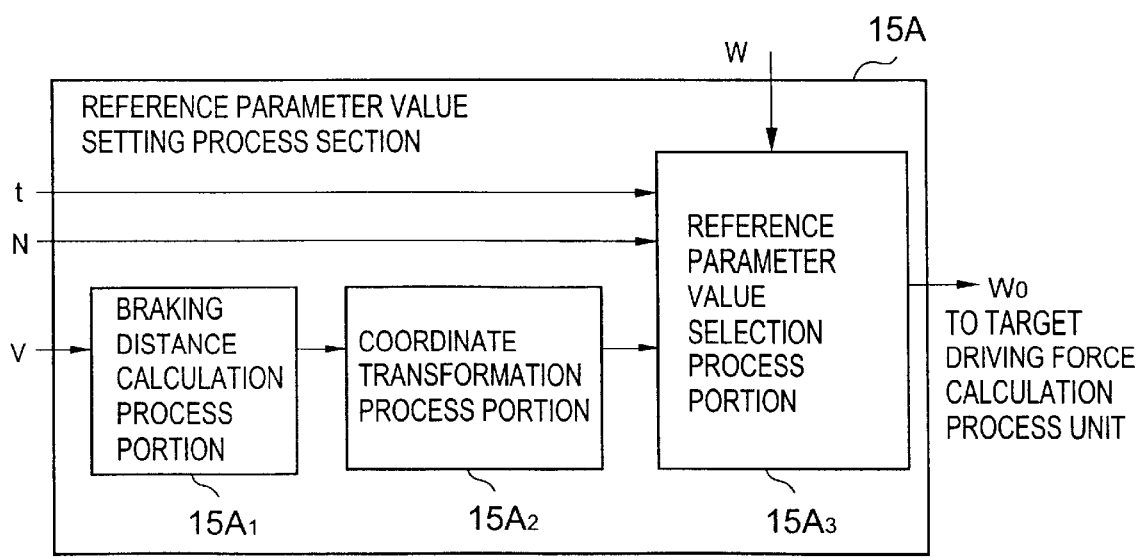
FIG. 20 is a detailed functional configuration diagram of a reference parameter value setting process section according to the fourth embodiment of the invention.
Figure 22:
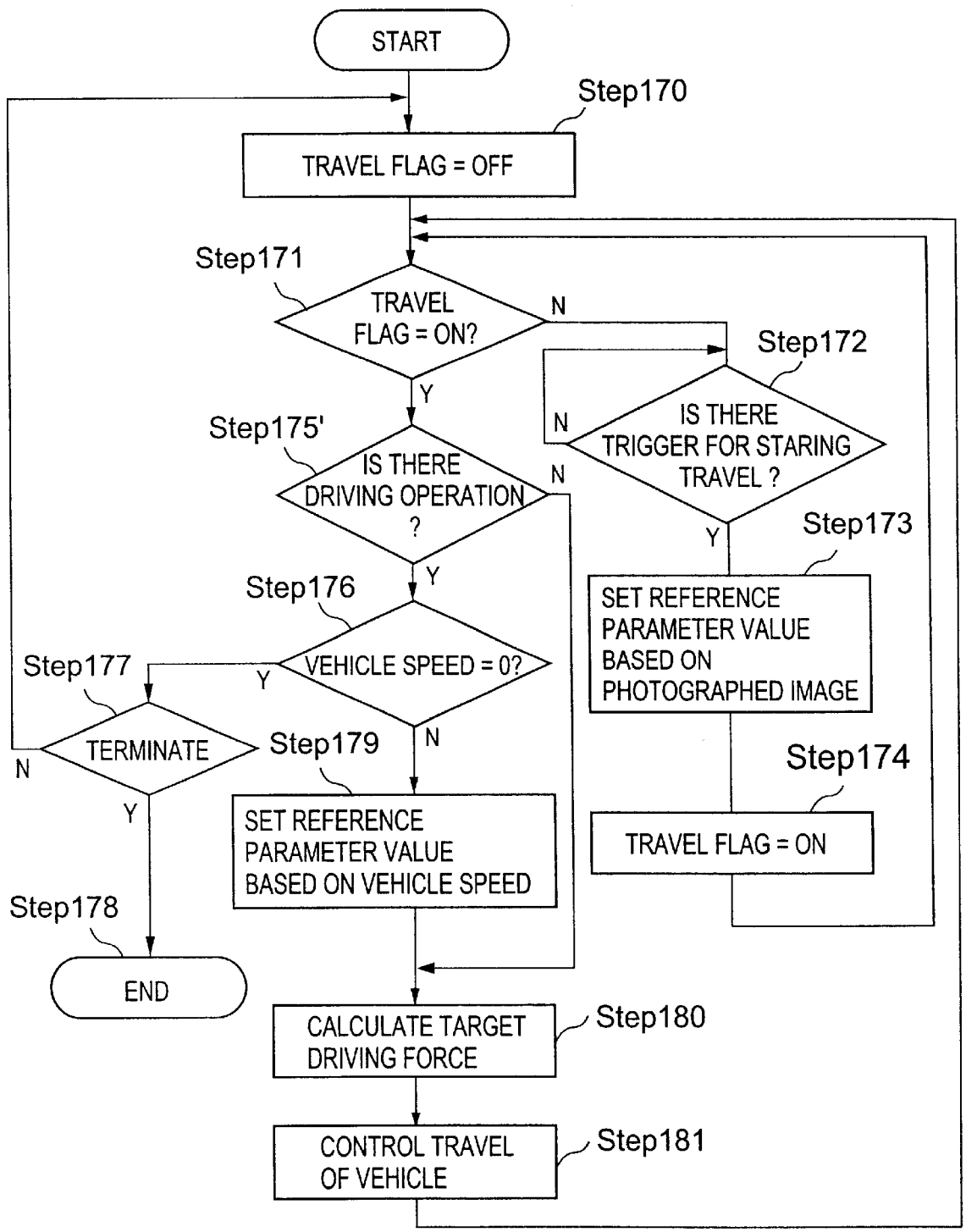
FIG. 22 is a flow chart showing processes performed by a microcomputer and a vehicle controller according to the fourth embodiment of the invention.

As shown in FIG. 20, a reference parameter value setting process section 15'''A implemented by a microcomputer 15''' in FIG. 18 receives the input of data N outputted from the driving operation detector 180 in addition to the output t from the travel start detector 12 and the output V from the vehicle speed sensor 110. A reference parameter value selection process portion $15'''A_3$ of the reference parameter value setting process section 15'''A in this case is different from the reference parameter value selection process portion $15''A_3$ of the reference parameter value setting process section 15''A implemented by the microcomputer 15'' in FIG. 15 (see FIG. 16) in that timing for updating the reference parameter value $W_0$ during a travel of the master vehicle is determined based on the output N of the driving operation detector 180. Therefore, the process performed by the microcomputer 15''' in FIG. 18 determines whether the driving operation detector 180 has outputted data N (step 175') as shown in FIG. 22, instead of determining whether a change in the vehicle speed has exceeded a predetermined value, and only when data SN has been outputted by the driving operation detector 180, the reference parameter value $W_0$ is updated based on the vehicle speed data V (step 179). This is the only difference from the processes shown in the flow chart of FIG. 17. As a result of such a difference, the reference parameter value $W_0$ is updated based on the vehicle speed at the time of occurrence of a driving operation of the driver and, therefore, the preference of the driver in driving is reflected upon cruise control of the vehicle 20B.

While an example has been referred to in which the reference parameter value $W_0$ is updated based on the vehicle speed of the vehicle 20B at the timing when a driving operation of the driver is detected, it is not essential to update the reference parameter value $W_0$ based on the master vehicle speed of the vehicle 20B. For example, in order to update the reference parameter value $W_0$ in the system shown in FIG. 1, the reference parameter value $W_0$ may be updated with the first geometric feature value extracted from an image pattern of a leading vehicle after a driving operation of the driver is detected.

While the coefficients $\alpha$ and $\beta$ included in Formula (2) for calculating a braking distance L have been described above as constants, those coefficients $\alpha$ and $\beta$ may be changed to improve the safety of a travel on a road.

For example, in the case of the system shown in FIG. 11 or 15, by setting great values as the coefficients $\alpha$ and $\beta$ when the vehicle speed data V of the vehicle 205 exceeds a threshold, it is possible to provide a longer braking distance L as the vehicle speed of the vehicle 20B increases. This improves the safety of a travel on a road. In the case of the system shown in FIG. 18, types of driving operations (discrimination between accelerating and decelerating operations) may be outputted from the driving operation detector 180 and, in addition, the coefficients $\alpha$ and $\beta$ may be increased when the driving operation is an accelerating operation and decreased when the driving operation is a decelerating operation. Since this makes it possible to provide a long braking distance during acceleration of the vehicle and to provide a shorter braking distance during deceleration of the vehicle, the safety of a travel on a road can be improved.

In general, a driver frequently adjusts the following distance between the master vehicle 20B and the leading vehicle 20A depending on condition of the driving environment from the viewpoint of the safety of traveling. For example, a driver tends to increase the following distance between the master vehicle 20B and the leading vehicle 20A during a travel at night time when the driver has a worse view than at day time or a travel on a road having curves, slopes and the like. It is therefore advantageous to change the coefficients $\alpha$ and $\beta$ depending on the time of the day and the configuration (curves, slopes and the like) of the road. A description will follow on a case wherein the system is configured to allow the coefficients $\alpha$ and $\beta$ of Formula (2) are changed depending on the time of the day and road configuration (curves, slopes and the like).

Figure 23:
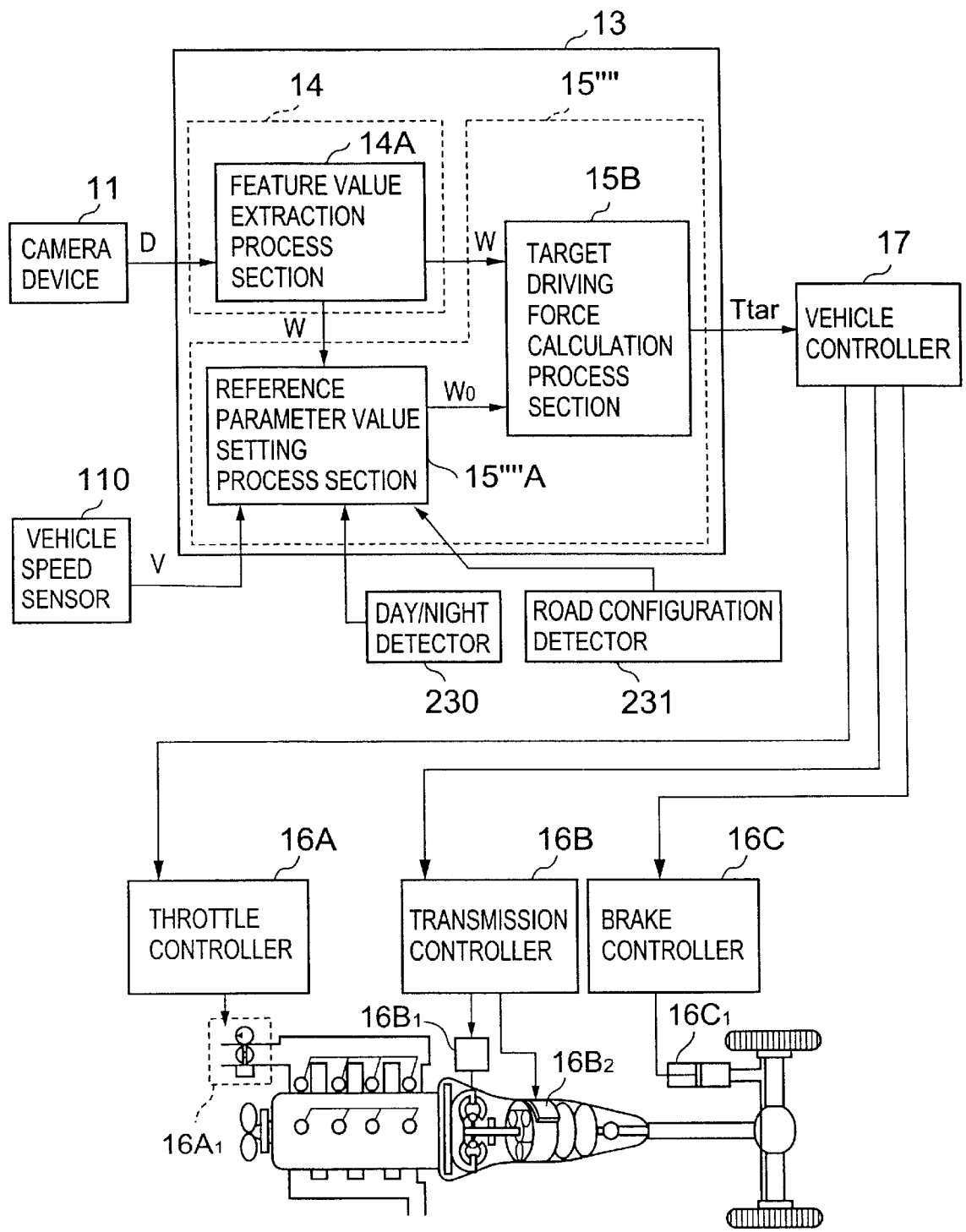
FIG. 23 is a schematic configuration diagram of a system according to a fifth embodiment of the invention.

For example, as shown in FIG. 23, the system in this case has a hardware configuration in which a day/night detector 230 and a road configuration detector 231 are added to the system shown in FIG. 11. Obviously, the day/night detector 230 and road configuration detector 231 may be added to the other systems described above. In other case, however, a microcomputer 15"" needs to execute additional processes. More specifically, processes need to be further added to the processes performed by the braking distance calculation process portion 15"$A_1$. A specific description will be made on an example in which the day/night detector 230 and road configuration detector 231 are added to the system shown in FIG. 11.

Figure 24:
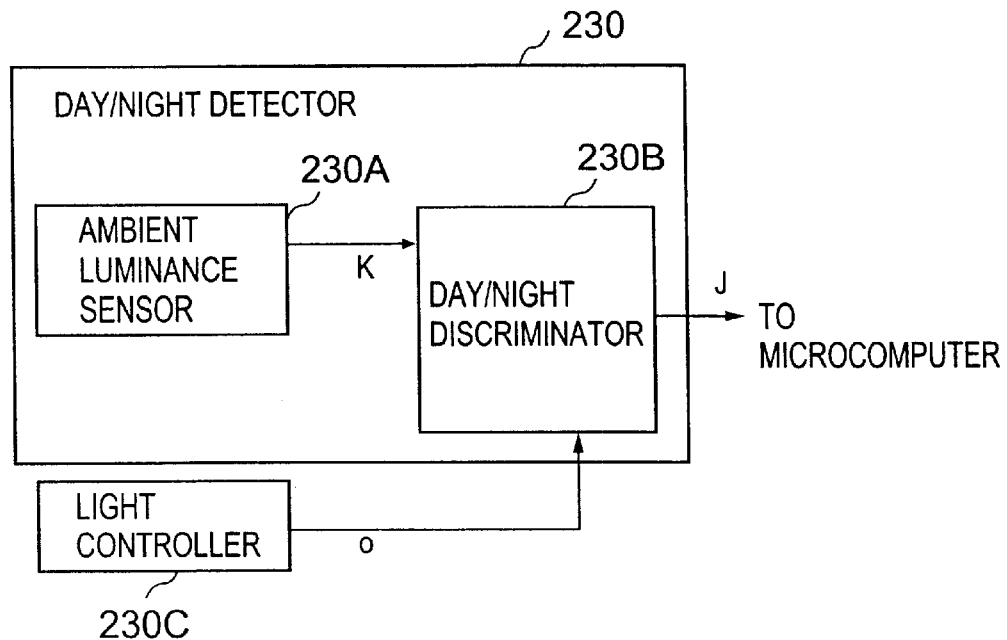
FIG. 24 is a diagram showing a configuration of the day/night detector in FIG. 23.

As shown in FIG. 24, the day/night detector 230 has (13) an ambient luminance sensor 230A for successively detecting the luminance K of the traveling environment and (14) a day/night discriminator 230B for discriminating day and night times from each other based on output K of the ambient luminance sensor 230A and output O of a light controller and for outputting the result of discrimination to the microcomputer 15. The light controller is an existing device for controlling turning on/off of the headlights of the vehicle 20B, and it outputs an ON/OFF states O of the head lights of the master vehicle 20B in this case.

In the day/night detector 230, each time the ambient luminance sensor 230A detects luminance K, the day/night discriminator 230B determines whether the luminance K is in the excess of a threshold. If the luminance K is in the excess of the threshold, data J indicating that the traveling environment of the master vehicle 20B is daytime is outputted and, if the luminance K is equal to or lower than the threshold, data J indicating that the traveling environment of the vehicle 20B is nighttime is outputted. Each time the light controller outputs an ON/OFF state O, the day/night discriminator 230B determines the ON/OFF state of the headlights based on the output data O. If the head lights are in an OFF state, data J indicating that the traveling environment of the vehicle 20B is day time is output and, if the head lights are in an ON state, data J indicating that the traveling environment of the vehicle 20B is night time is outputted.

Figure 25:
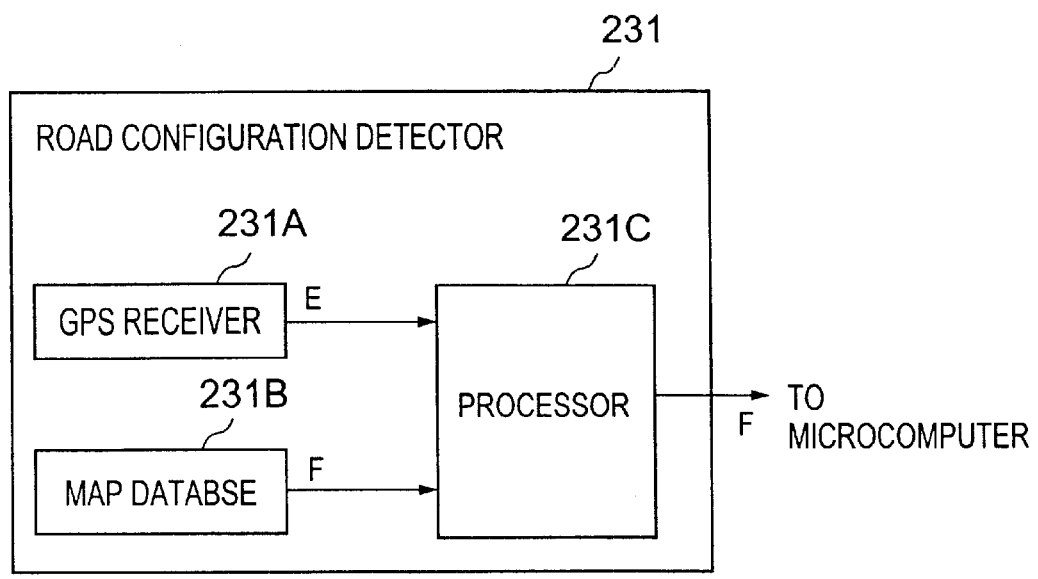
FIG. 25 is a diagram for explaining a configuration of the road shape detector in FIG. 23.

As shown in FIG. 25, the road configuration detector 231 has (15) a GPS (global positioning system) receiver 231A for detecting the traveling position E (latitude and longitude) of the master vehicle 20B from an electric wave emitted from a satellite, (16) a map database 231B in which map information including information F associated with the shapes of roads (presence and absence of curves, slopes and so on) is stored and (17) a processor 231C for reading from the map database 231B, information r associated with the configurations of a road located at a predetermined distance ahead the traveling position indicated by the output E of the GPS receiver 231A and for outputting the information F. The map database 231B is stored in a recording medium (CD-ROM or the like) mounted on the road configuration detector 231. A navigation device may be used as such a road configuration detector 231.

Figure 26:
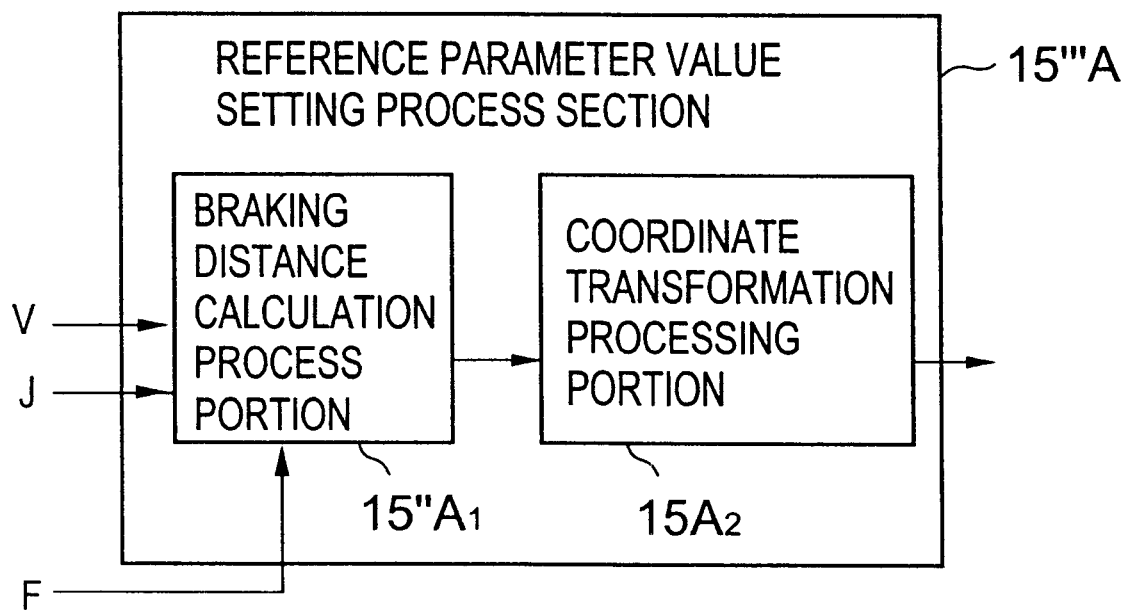
FIG. 26 is a detailed functional configuration diagram of a reference parameter value setting process section according to the fifth embodiment of the invention.

As shown in FIG. 26, the output J of the day/night discriminator 230 and the output F of the road configuration detector 231 are also inputted to the braking distance calculation process portion 15'$A_1$ implemented by the microcomputer 15"" in FIG. 23 in addition to the output V of the vehicle speed sensor 110. In this case, the braking distance calculation process portion 150$A_1$ determines the two coefficients $\alpha$ and $\beta$ of Formula (2) based on the output J of the day/night discriminator 230 and the output F of the road configuration detector 231 respectively and thereafter executes processes similar to those at the braking distance calculation process portion 15'$A_1$ implemented by the microcomputer 15" in FIG. 15.

Figure 27:
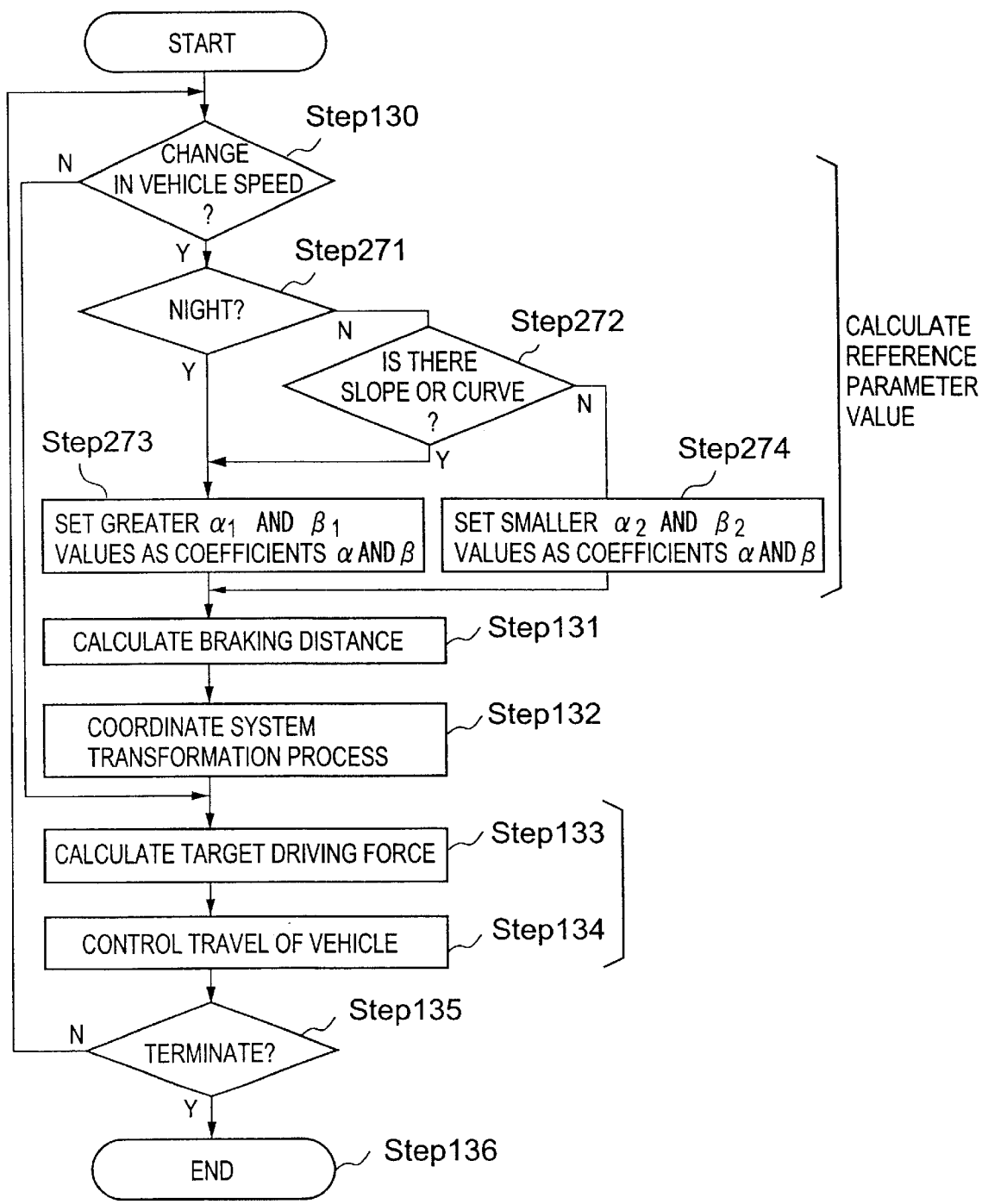
FIG. 27 is a flow chart showing processes performed by a microcomputer and a vehicle controller according to the fifth embodiment of the invention.

Specifically, as shown in FIG. 27, steps 271 through 273 are added to the processes performed by the braking distance calculation process portion 15"$A_1$. As a result, upon receipt of the vehicle speed data V from the vehicle speed sensor 110, the braking distance calculation process portion 15"$A_1$ determines whether it is day time or night time based on the output J of the day/night discriminator 230 before executing the process of calculating the braking distance L (step 131). As a result, at night time, first set values $\alpha_1$ and $\beta_1$ are respectively set as the two coefficients $\alpha$ and $\beta$ of Formula (2) used for the process of calculating the braking distance L (step 131). At day time, the braking distance calculation process portion 15"A₁ further determines whether a curve or slope exists at a predetermined distance ahead the traveling position of the vehicle 20B based on the output F of the road shape detector 231 (step 272). If a curve or slope exists, first set values $\alpha_1$ and $\beta_1$ are respectively set as the two coefficients a and $\beta$ of Formula (2) used for the process of calculating the braking distance L (step 131). If neither curve nor slope exists, second set values $\alpha_2$ and $\beta_2$ are respectively set as the two coefficients $\alpha$ and $\delta$ of Formula (2) used for the process of calculating the braking distance L (step 131). The second set value $\alpha_2$ for the coefficient $\alpha$ is a value smaller than the first set value $\alpha_1$ for the coefficient $\alpha$. and the second set value $\beta_2$ for the coefficient $\beta$ is a value smaller than the first set value $\beta_1$ for the coefficient $\beta$.

The process is different from the process described with reference to the flow chart shown in FIG. 13 only in that such steps 271 through 273 are added. Since such a difference makes it possible to adjust the following distance to the leading vehicle 20A depending on changes in the traveling environmental condition of the master vehicle 20B, the safety of a travel on a road can be improved.

While two values of different magnitudes are respectively set as the coefficients $\alpha$ and $\beta$ of Formula (2) depending on the traveling environment of the master vehicle 2013 at the process shown in FIG. 27, three or more values which are different from each other in magnitude may be set depending on the traveling environment of the master vehicle 20B. The coefficients $\alpha$ and $\beta$ of Formula (2) may be incremented or decremented depending on the traveling environmental condition of the master vehicle 20B.

In any of the above-described systems, the width of an image pattern 20*a* of a leading vehicle 20A in the direction of an X-axis is extracted as a geometric feature value of the image pattern 20*a*. However, this is not limiting the present invention.

For example, as described above, the interval between taillights in the image pattern 20*a* of the leading vehicle may be extracted as a geometric feature value of the image pattern 20*a*. The process performed in this case is similar to the process of extracting the width of the image pattern 20*a* in the direction of the X-axis.

Figure 28:
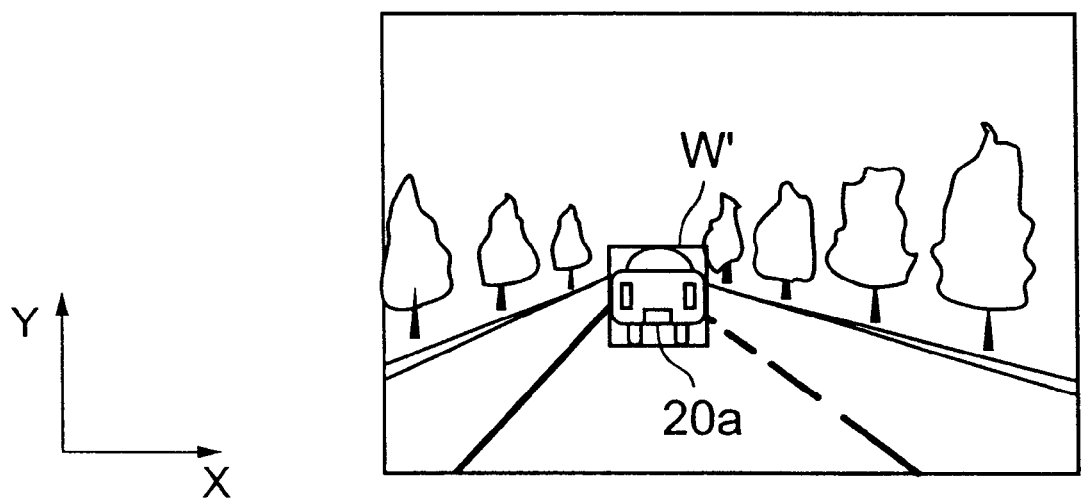
FIG. 28 is an illustration for explaining another method for extracting a geometric feature value of an image pattern of a leading vehicle.

As shown in FIG. 28, the area of a rectangular region W' which is contiguous with the image pattern 20*a* of the leading vehicle may be extracted as a geometric feature value of the image pattern 20*a* of the leading vehicle. In such a cage, the width of the image pattern 20*a* of the leading vehicle in the direction of a Y-axis perpendicular to the x-axis may be extracted in addition to the extraction of the width in the direction of the X-axis through a similar process, and the product of those two values may be calculated as the area of the rectangular region W' contiguous with the image pattern 20*a* of the leading vehicle.

As apparent from the above description, the present invention provides a more practical ACC system in any modes for carrying out the same.

What is claimed is:

1. A cruise control system loaded on a vehicle, comprising:
   a camera device for successively photographing a leading vehicle in front of the vehicle;
   an image processor for successively extracting geometric feature values of image patterns of the leading vehicle from images photographed by the camera device;
   a detector for detecting a start of a travel of the vehicle;
   a vehicle controller for controlling the vehicle based on a control command supplied thereto; and
   a computer for setting a geometric feature value extracted by the image processor as a reference parameter value, when the start of the travel of the vehicle is detected by the detector, and for calculating the control command to be supplied to the vehicle controller based on a difference between the geometric feature value extracted after the reference parameter value is set and the reference feature value.

2. A cruise control system according to claim 1, comprising a vehicle speed sensor for successively detecting a speed of the vehicle, wherein:
   the computer sets a first geometric feature value extracted after the start of a travel of the vehicle is detected by the detector, as the reference parameter value; and
   the reference parameter value is updated based on a value detected by the vehicle speed sensor at a timing that is determined in accordance with a change in the value detected by the vehicle speed sensor.

3. A cruise control system loaded on a vehicle, comprising:
   a camera device for successively photographing a leading vehicle in front of the vehicle;
   an image processor for successively extracting geometric feature values of image patterns of the leading vehicle from images photographed by the camera device;
   a vehicle speed sensor for detecting a speed of the vehicle,
   a vehicle controller for controlling the vehicle based on a control command supplied thereto; and
   a computer for calculating a reference parameter value for the geometric feature values of the image patterns of the leading vehicle based on a value detected by the vehicle speed sensor, and for calculating the control command to be supplied to the vehicle controller based on a difference between the reference parameter value and the geometric feature value extracted after the reference parameter value is calculated.

4. A cruise controller according to claim 1, comprising a driving operation detector for detecting an occurrence of a driving operation, wherein the computer updates the reference parameter value at a timing determined in accordance with a result of the detection by the driving operation detector.

5. A cruise controller according to claim 3, comprising a driving operation detector for detecting an occurrence of a driving operation, wherein the computer updates the reference parameter value at timing determined in accordance with a result of the detection by the driving operation detector.

6. A cruise controller according to claim 1, comprising a road configuration detector for detecting a configuration of a road on which the vehicle travels, wherein the computer updates the reference parameter value at a timing determined in accordance with a result of the detection by the road configuration detector.

7. A cruise controller according to claim 3, comprising a road configuration detector for detecting a shape of a road on which the vehicle travels, wherein the computer updates the reference parameter value at a timing determined in accordance with a result of the detection by the road shape detector.

8. A cruise controller according to claim 1, comprising a luminance detecting sensor for detecting a luminance of a traveling environment of the vehicle, wherein the computer updates the reference parameter value at timing determined in accordance with a result of the detection by the luminance detecting sensor.

9. A cruise controller according to claim 3, comprising a luminance detecting sensor for detecting a luminance of a traveling environment of the vehicle, wherein the computer updates the reference parameter value at timing determined in accordance with a result or the detect on by the luminance detecting sensor.

10. A vehicle comprising:

a vehicle body; and a cruise control system according to claim 1.

11. A vehicle comprising:

a vehicle body; and a cruise control system according to claim 3.

12. A cruise control unit for calculating a control command to be supplied to a vehicle controller for controlling a vehicle, comprising:

an image processor for successively extracting geometric feature values of image patterns of a leading vehicle in front of the vehicle from images inputted thereto; and a computer for setting a geometric feature value extracted by the image processor as a reference parameter value for the geometric feature values of the image patterns of the leading vehicle, when the vehicle starts traveling, and for calculating the control command to be supplied to the vehicle controller based on a difference between the geometric feature value extracted after the reference parameter value is set and the reference feature value.

13. A cruise control unit for calculating a control command to be supplied to a vehicle controller for controlling a vehicle, comprising:

an image processor for successively extracting geometric feature values of image patterns of a leading vehicle in front of the vehicle from images inputted thereto; and a computer for calculating a reference parameter value for the geometric feature value of the image patterns of the leading vehicle based on the speed of the vehicle and for calculating the control command to be supplied to the vehicle controller based on a difference between the reference parameter value and the geometric feature value extracted after the reference parameter value is calculated.

14. A cruise control system loaded on a vehicle, comprising:

a camera device for successively photographing a leading vehicle in front of the vehicle;

an image processor for successively extracting geometric feature values of image patterns of the leading vehicle from images photographed by the camera device;

a vehicle controller for controlling the vehicle based on a control command supplied thereto; and a computer for setting a geometric feature value extracted by the image processor as a reference parameter value, when a predetermined event happens, and for calculating the control command to be supplied to the vehicle controller based on a difference between the geometric feature value extracted after the reference parameter value is set and the reference feature value.

* * * * *